(12) United States Patent
Yang et al.

(10) Patent No.: US 10,803,495 B2
(45) Date of Patent: Oct. 13, 2020

(54) ADVERTISING CREATIVE PROCESSING METHOD, ADVERTISING CREATIVE PROCESSING APPARATUS, AND STORAGE MEDIUM

(71) Applicant: Tencent Technology (Shenzhen) Company Limited, Shenzhen (CN)

(72) Inventors: Chenjun Yang, Shenzhen (CN); Can Zheng, Shenzhen (CN); Qi Jin, Shenzhen (CN); Zhengyun Chen, Shenzhen (CN); Qian Wang, Shenzhen (CN); Wenhao Deng, Shenzhen (CN); Jiajia Luo, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 272 days.

(21) Appl. No.: 15/993,315

(22) Filed: May 30, 2018

(65) Prior Publication Data
US 2018/0276720 A1    Sep. 27, 2018

Related U.S. Application Data

(63) Continuation-in-part of application No. PCT/CN2017/081275, filed on Apr. 20, 2017.

(30) Foreign Application Priority Data

Apr. 20, 2016   (CN) .......................... 2016 1 0251004

(51) Int. Cl.
*G06Q 30/02* (2012.01)
*G06Q 30/06* (2012.01)
*G06F 16/951* (2019.01)

(52) U.S. Cl.
CPC ....... *G06Q 30/0276* (2013.01); *G06F 16/951* (2019.01); *G06Q 30/0277* (2013.01); *G06Q 30/0641* (2013.01)

(58) Field of Classification Search
None
See application file for complete search history.

(56) References Cited

U.S. PATENT DOCUMENTS

2010/0223278 A1* 9/2010 Lee .................. G06Q 10/00
707/769
2014/0114758 A1* 4/2014 Bentley .............. G06Q 30/0277
705/14.53

FOREIGN PATENT DOCUMENTS

CN    101521731 A    9/2009
CN    104077136 A    10/2014
(Continued)

OTHER PUBLICATIONS

Tencent Technology, Written Opinion, PCT/CN2017/081275, dated Jul. 7, 2017, 5 pgs.
(Continued)

*Primary Examiner* — Alexandru Cirnu
(74) *Attorney, Agent, or Firm* — Morgan, Lewis & Bockius LLP

(57) ABSTRACT

A server provides an exchange platform linking requesters for creatives and creative manufacturing systems. A specification for required creatives is distributed to multiple creative manufacturing systems, and triggers parallel manufacturing of the required creatives on at least a first and a second creative manufacturing system, each proceeds with a respective portion of the required quantity of the required creatives. Before each manufacturing system completes their respective portions of the manufacturing, the server independently requests and receives, in multiple discrete batches, respective quantities of the required creatives that (Continued)

have been completed by the first and second creative manufacturing systems. The server performs independent and parallel verification on the respective quantities of the required creatives that have been completed by the first and second creative manufacturing systems.

20 Claims, 13 Drawing Sheets

(56) References Cited

FOREIGN PATENT DOCUMENTS

| CN | 104506964 | A | 4/2015 |
|---|---|---|---|
| CN | 104965813 | A | 10/2015 |
| CN | 105956874 | A | 9/2016 |
| CN | 105976203 | A | 9/2016 |
| WO | WO 2014059124 | A2 | 4/2014 |

OTHER PUBLICATIONS

Tencent Technology, IPRP, PCT/CN2017/081275, Oct. 23, 2018, 6 pgs.
Tencent Technology, ISR, PCT/CN2017/081275, dated Jul. 7, 2017, 2 pgs.

\* cited by examiner

Creative manufacturing request submission page

| Field | Value |
|---|---|
| Advertiser ID | xxx |
| Advertisement system service ID | xxx |
| Advertising creative specification ID | xxx |

Merchant information

| Field | Value |
|---|---|
| Merchant ID | xxx |
| Merchant name | xxx |
| Merchant industry | xxx |

Product information

| Field | Value |
|---|---|
| Product ID | xxx |
| Product classification | xxx |
| Product name | xxx |

| Field | Value |
|---|---|
| Landing page address (jump address) | https://x.x.x.x |

Creative configuration item

| Field | Value |
|---|---|
| Creative supplier ID | xxx |
| Number of advertising creatives | xxx |
| Advertising creative template ID | xxx |
| Advertising creative template ID | xxx |
| Return time | xxx |

Return to modify     Confirm to submit

FIG. 3

| Processed creative manufacturing request | |
|---|---|
| Advertiser ID | xxx |
| Advertisement system service ID | xxx |
| Creative manufacturing request ID | xxx |
| Advertising creative specification: Image type | xxx |
| Advertising creative specification: Image width/height | xxx |
| Advertising creative specification: Maximum number of bytes of the image | xxx |
| Advertising creative specification: Maximum length of the title/description | xxx |
| Advertising creative specification: Minimum length of the title/description | xxx |
| Merchant information: Product ID | xxx |
| Merchant information: Merchant name | xxx |
| Merchant information: Merchant industry | xxx |
| Product information: Merchant ID | xxx |
| Product information: Product classification | xxx |
| Product information: Product name | xxx |
| Landing page address (jump address) | https://x.x.x.x |
| Creative configuration item: Creative supplier ID | xxx |
| Creative configuration item: Number of advertising creatives | xxx |
| Creative configuration item: Advertising creative template ID | xxx |
| Creative configuration item: Advertising creative template ID | xxx |
| Creative configuration item: Return time | xxx |

FIG. 4

ADVERTISING CREATIVE PROCESSING METHOD, ADVERTISING CREATIVE PROCESSING APPARATUS, AND STORAGE MEDIUM

CROSS-REFERENCE TO RELATED APPLICATIONS

This application is a continuation-in-part application of PCT Application No. PCT/CN2017/081275, entitled "ADVERTISING CREATIVE PROCESSING METHOD, ADVERTISING CREATIVE PROCESSING APPARATUS, AND STORAGE MEDIUM", filed Apr. 20, 2017, which claims priority to Chinese Patent Application No. 201610251004.6, entitled "ADVERTISING CREATIVE PROCESSING METHOD, ADVERTISING CREATIVE PROCESSING APPARATUS, AND STORAGE MEDIUM" filed with the Chinese Patent Office on Apr. 20, 2016, all of which are incorporated by reference in their entirety.

FIELD OF THE TECHNOLOGY

The present disclosure relates to manufacturing and processing technologies of creatives, and in particular, to a platform linking multiple creative requesters and creative manufacturing systems.

BACKGROUND OF THE DISCLOSURE

With the booming development of the Internet industry, Internet advertisements (advertisements for short below) have become an important approach for advertiser sides to improve the popularity and brand images, increase the product sales volume, and improve the service revenue. An advertising creative determines the final presentation form of an Internet advertisement, and the quality of the advertising creative directly affects the push effects of the Internet advertisement. Providing a high-quality advertising creative requires a relatively high technology, and therefore becomes a barrier in a process of pushing network advertisements by massive small and medium-sized advertiser sides. At present, there are mainly two manners of generating an advertising creative:

(1) An advertiser side designs an advertising creative and submits the advertising creative to an advertising agency for advertisement push.

The advertiser side designs and manufactures an advertising creative according to a specification limitation of a pre-selected advertisement slot and with reference to information needing to be propagandized by means of advertising, and locally uploads the advertising creative from the advertiser side to an advertisement system in a push procedure. The advertisement system pushes, based on the advertising creative, an advertisement in the advertisement position. Small and medium-sized advertiser sides generally have no professional conditions of advertising creatives, and consequently, the quality of an advertising creative is low, and a case in which an uploaded advertising creative does not meet a specification (for example, the size of an image does not match the size of an advertisement position) often occurs. The advertising creative needs to be modified, and consequently, a manufacturing period of the advertising creative is relatively long, the expected push effects of an advertisement are affected, and further, the utilization of the advertisement slot of the advertisement system may be reduced.

(2) An advertiser side requests a third party to design an advertising creative.

The advertiser side specifies an advertisement slot required for advertisement push, and provides material information for manufacturing an advertising creative. An Internet enterprise design team manufactures the advertising creative instead, and selects a manufactured advertising creative to upload to an advertisement system. In such an advertising creative manufacturing manner, problems that costs of communication between the advertiser side and the third party are relatively high and a manufacturing period of the advertising creative is relatively long exist. Consequently, the effects of information propaganda are affected, and further, the utilization of the advertisement slot of the advertisement system may be reduced.

In conclusion, there is no effective solution in the related technology for a technical problem that an advertiser side is supported to quickly obtain an advertising creative meeting a specification to shorten a period from generation of an advertising creative requirement by the advertiser side to advertisement push performed by an advertisement system based on an advertising creative, and further to improve the utilization of an advertisement slot of the advertisement system.

SUMMARY

To resolve at least the foregoing technical problem, embodiments of the present technology provide an advertising creative processing method, an advertising creative processing apparatus, and a storage medium.

Technical solutions of the embodiments of the present technology are implemented in this way:

A method, comprising: at a server having one or more processors and memory, the server providing an exchange platform linking a plurality of requesters for creatives and a plurality of creative manufacturing systems:

receiving, by the server, a creative manufacturing request from a first requester, the creative manufacturing request includes a specification for required creatives and a required quantity for the required creatives;

distributing, by the server, the specification for the required creatives to the plurality of creative manufacturing systems, including at least a first creative manufacturing system and a second creative manufacturing system that is independent of the first creative manufacturing system;

triggering, by the server, parallel manufacturing of the required creatives on at least the first creative manufacturing system and the second creative manufacturing system, wherein the first creative manufacturing system proceeds with a first portion of the required quantity and the second creative manufacturing system proceeds with a second portion of the required quantity; and before completion of manufacturing of the first portion of the required quantity by the first creative manufacturing system and before completion of manufacturing of the second portion of the required quantity by the second creative manufacturing system:

independently requesting and receiving, by the server and in multiple discrete batches, respective quantities of the required creatives that have been completed by the first creative manufacturing system and the second creative manufacturing system; and performing, by the server, independent and parallel verification on the respective quantities of the required creatives that have been completed by the first creative manufacturing system and the second creative manufacturing system.

According to a first aspect, an embodiment of the present technology provides an advertising creative processing method, including:

obtaining an advertising creative specification submitted by a user;

sending the advertising creative specification to at least one advertising creative manufacturing system, and triggering the at least one advertising creative manufacturing system to manufacture in parallel advertising creatives meeting the advertising creative specification;

searching, in parallel and in batches, each advertising creative manufacturing system for different advertising creatives manufactured by the advertising creative manufacturing system, and triggering each advertising creative manufacturing system to return, after an advertising creative included in any searched batch is manufactured, the manufactured advertising creative as a search result of the corresponding batch; and performing parallel processing on each advertising creative included in any respective batch, and sending the processed advertising creative to the user.

An embodiment of the present disclosure provides an advertising creative processing apparatus, including a memory and a processor, the memory storing executable instructions, and the executable instructions being used for causing the processor to perform the disclosed methods.

An embodiment of the present disclosure provides a storage medium, storing executable instructions, and used for performing the advertising creative processing method according to the disclosed methods.

In the embodiments of the present technology, a plurality of advertising creative manufacturing systems is caused, in a parallel processing manner, to manufacture, based on an advertisement specification, advertising creatives. Each advertising creative manufacturing system is searched in batches for advertising creatives requested to be manufactured, and searches of the batches are performed in parallel, so that an advertising creative included in a searched batch can be immediately returned to a creative exchange platform after being manufactured by the advertising creative manufacturing system. In addition, parallel processing is also performed on an advertising creative included in any respective batch returned by the advertising creative manufacturing system, so as to maximally shorten a period of returning the advertising creative to an advertiser side, improve the manufacturing efficiency of the advertising creative, and help a user to choose a required advertising creative for advertisement push. In addition, because the advertising creative is manufactured based on the advertising creative specification, a case in which the user requires to re-manufacture an advertising creative is avoided, and a period of advertising creative manufacturing is shortened, so that an advertisement of the advertiser can be pushed as soon as possible, thereby ensuring the utilization of an advertisement slot of an advertisement system.

BRIEF DESCRIPTION OF THE DRAWINGS

FIG. 2-1 to FIG. 2-5 are an optional schematic flowchart of an advertising creative processing method according to an embodiment of the present technology;

FIG. 3 is an optional schematic diagram of a submission interface for submitting a creative manufacturing request by an advertiser side according to an embodiment of the present technology;

FIG. 4 is an optional schematic diagram of a data structure of a creative manufacturing request submitted by a creative exchange platform to an advertising creative manufacturing system according to an embodiment of the present technology;

FIG. 5-1 and FIG. 5-2 are a schematic diagram of searching an advertising creative manufacturing system for advertising creatives by a creative exchange platform in a pagination long-polling manner according to an embodiment of the present technology;

FIG. 6-1 and FIG. 6-2 are a schematic diagram of searching an advertising creative manufacturing system for advertising creatives by a creative exchange platform in a session manner according to an embodiment of the present technology;

FIG. 8-1 and FIG. 8-2 are schematic interaction diagrams of a socket-based session between a creative exchange platform and an advertising creative manufacturing system according to an embodiment of the present technology;

DESCRIPTION OF EMBODIMENTS

Figure 1:
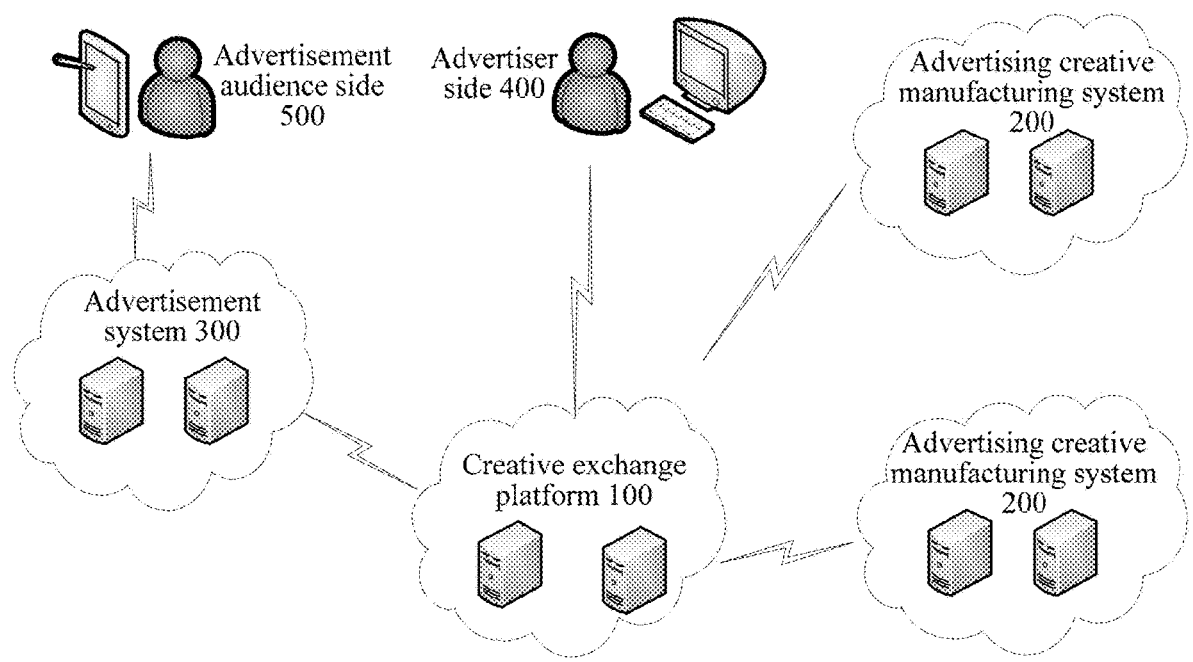
FIG. 1 is an optional schematic diagram of a topology structure of an advertising creative processing system according to an embodiment of the present technology.

The present disclosure is further described below in detail with reference to the accompanying drawings and embodiments. It should be understood that the specific embodiments described herein are merely used for explaining the present disclosure but are not intended to limit the present disclosure.

An advertising creative reflects a requirement of an advertiser side for propagandizing information, for example, propagandizing a corporate image, a product, and a service of the advertiser side. In terms of composition of an advertising creative, the advertising creative includes elements forming a to-be-released advertisement. The elements forming an advertisement vary according to different advertiser sides, and may be, for example, at least one of the following materials: a video (or a video address), audio (or an audio address), an image (or an image address), and text. In the related technology, an advertising creative provided for an advertiser side is generally pre-generated and is simply modified according to a material provided by the advertiser side, or a pre-manufactured advertising creative is returned to the advertiser side. In addition, an advertisement slot that is selected by the advertiser side from an advertisement system and used for advertisement push has unpredictable randomness, inevitably causing a case in which a conflict exists between an advertisement pushed by the advertisement system according to an advertising creative submitted by the advertiser side and a specification of the advertisement position. For one thing, the advertisement slot becomes idle, affecting the utilization of the advertisement position. For another thing, the advertiser side further needs to continue modifying the advertising creative, prolonging a period of pushing the advertisement by the advertiser side, and effecting the utilization of the advertisement position.

For a problem in the related technology that the utilization of an advertisement slot of an advertisement system is affected due to that an advertiser side cannot be quickly provided with an advertising creative meeting a specification, the embodiments of the present technology provide an advertising creative processing method and apparatus. The advertising creative processing apparatus is used as an entity for implementing the advertising creative processing method, and may be implemented in a plurality of manners during actual application. For example, the advertising creative processing apparatus is implemented as a platform system using a server or a server cluster as a bearer, to perform exchange with an advertisement service entity (for example, an advertisement system) in a network service manner. For another example, the advertising creative processing apparatus is used as a functional module to be embedded into an existing advertisement service entity, to share a hardware resource (for example, a communications interface and a computing resource) with the embedded advertisement service entity. The following uses an example in which the advertising creative processing apparatus is implemented as a creative exchange platform for description. Another implementation form of the advertising creative processing apparatus may be implemented by a person skilled in the art according to understanding of the following recordation.

FIG. 1 is an optional schematic diagram of a topology structure of an entity related to an advertising creative processing method according to an embodiment of the present technology. The topology structure includes: an advertiser side 400, an advertisement audience side 500, a creative exchange platform 100, an advertisement system 300, and a plurality of advertising creative manufacturing systems 200. In this embodiment of the present technology, an advertiser, and a software device and a hardware device that are used by the advertiser for communicating with the advertisement system 300 and the creative exchange platform 100 are all referred to as the advertiser side. The advertiser side selects an advertisement slot needing to be used for advertisement push from candidate advertisement slots provided by the advertisement system, and submits a request for manufacturing an advertising creative (creative manufacturing request for short below) to the creative exchange platform. The creative exchange platform requests, according to the creative manufacturing request from the advertiser side, advertising creative manufacturing systems corresponding to a plurality of creative suppliers to manufacture advertising creatives, and return manufactured advertising creatives to the advertiser side for selecting by the advertiser side. The advertiser side selects an advertising creative needing to be used and submits the advertising creative to the advertisement system. The advertisement system pushes, according to the advertising creative submitted by the advertiser side, an advertisement in the advertisement slot pre-selected by the advertiser side. In this embodiment of the present technology, advertisement audience, and hardware (for example, a terminal such as an intelligent mobile phone and a notebook computer) and software (for example, various applications installed in a terminal) that are used by the advertisement audience for advertisement playing are referred to as the advertisement audience side.

FIG. 1 exemplarily shows two advertising creative manufacturing systems 200 connected to the creative exchange platform 100. During actual application, many third-party creative suppliers exist, and different creative suppliers respectively run independent advertising creative manufacturing systems to provide services of manufacturing advertising creatives for the advertiser side. For a case in which third-party creative suppliers respectively independently run advertising creative manufacturing systems, the creative exchange platform may open a particular interface to support access of a plurality of advertising creative manufacturing systems.

In addition, the creative exchange platform opens a particular interface to support access of a plurality of advertiser sides, and performs parallel processing on creative manufacturing requests submitted by the plurality of advertiser sides. Particular interfaces are provided for the advertiser side and the advertising creative manufacturing system, so as to implement interconnection between the requirement of the advertiser side for advertising creative manufacturing and a service of advertising creative manufacturing provided by the creative supplier. The request for advertising creative manufacturing from the advertiser side is submitted to the advertising creative manufacturing system, and an advertising creative manufactured by the advertising creative manufacturing system is returned to the advertiser side. That is, the creative exchange platform implements a pipeline function, and effectively integrates services of advertising creative manufacturing that are provided by existing creative suppliers by using the advertising creative manufacturing systems.

Communication between the advertiser side and the creative exchange platform and communication between the creative exchange platform and the advertising creative manufacturing systems may be based on the Hypertext Transfer Protocol (HTTP). Communication between the creative exchange platform and the advertising creative manufacturing systems is used as an example. The creative exchange platform may run a client based on a network service such as a RESTful web service, and the advertising creative manufacturing system runs a server based on the RESTful web service, to implement the communication between the creative exchange platform and the advertising creative manufacturing system. A communication specification such as a format of an exchanged message or a field of an exchanged message is agreed upon between communication parties in advance. Encapsulation of the exchanged message between the communication parties is described by using any existing data structure, for example, may be described by uniformly using a JavaScript Object Notation (JSON) format. Using these simple webpage request and return format for creative request and return on the exchange platform makes the exchange platform more accessible to a wider range of creative manufacturers because existing webpage request and return practices can be utilized without need for additional special purpose software to be developed. When new creatives are manufactured, the manufacturing system simply storage them in a storage space with an appropriate identifier, and the web service can automatically generate the return page including the newly manufactured creatives in response to a web request received from the exchange platform.

In a phase in which the advertiser side submits an order of advertisement push to the advertisement system, the advertiser side performs selection among advertisement slots that are provided by the advertisement system and can be used for advertisement push, and determines an advertisement slot needing to be used for advertisement push. The advertisement slot provided in this embodiment of the present technology is any available position in a terminal of advertisement audience, for example, a startup interface of any application in the terminal, or an information pushing interface of any application in the terminal, that can be used for advertisement loading. As described above, due to limitations of the advertisement slot in aspects such as the size and the information type supported to be loaded, in this embodiment of the present technology, an advertising creative used for an advertisement that is pushed in the advertisement slot needs to meet a specification (that is, an advertising creative specification) of the advertisement position. Correspondingly, after the advertiser side determines, in the advertisement system, the advertisement slot needing to be used, to make the advertiser side learn of the advertising creative used for advertisement push in the selected advertisement position, the advertisement system transmits, to the advertiser side, the specification of the advertisement slot or an identifier, for example, a sequence number (ID), of the specification of the advertisement slot that is agreed upon with the creative exchange platform in advance, so that the advertiser side selects the advertising creative according to the advertising creative specification, to avoid a problem that after the advertising creative specification is uploaded to the advertisement system, an advertisement manufactured by the advertisement system based on the advertising creative selected by the advertiser side cannot be pushed in the advertisement slot selected by the advertiser side, thereby preventing the utilization of the advertisement slot from being affected due to idleness of the advertisement position.

Figures 1, 2:
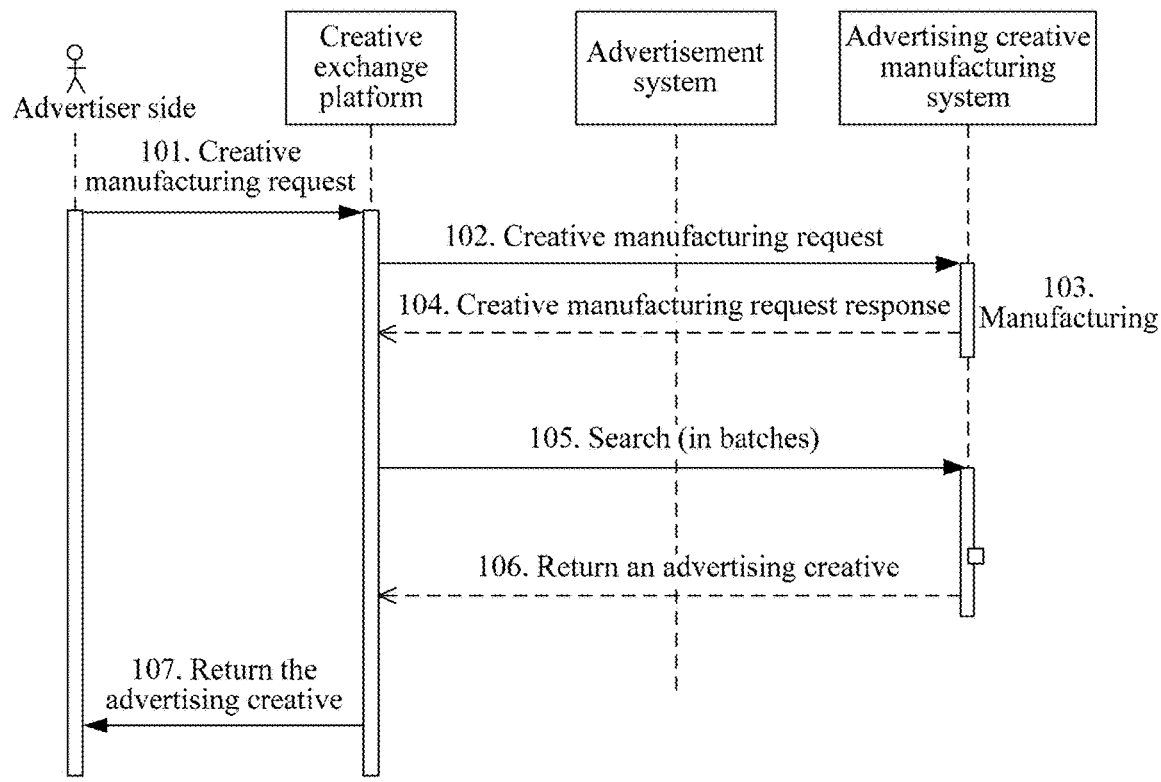
Figure 2:
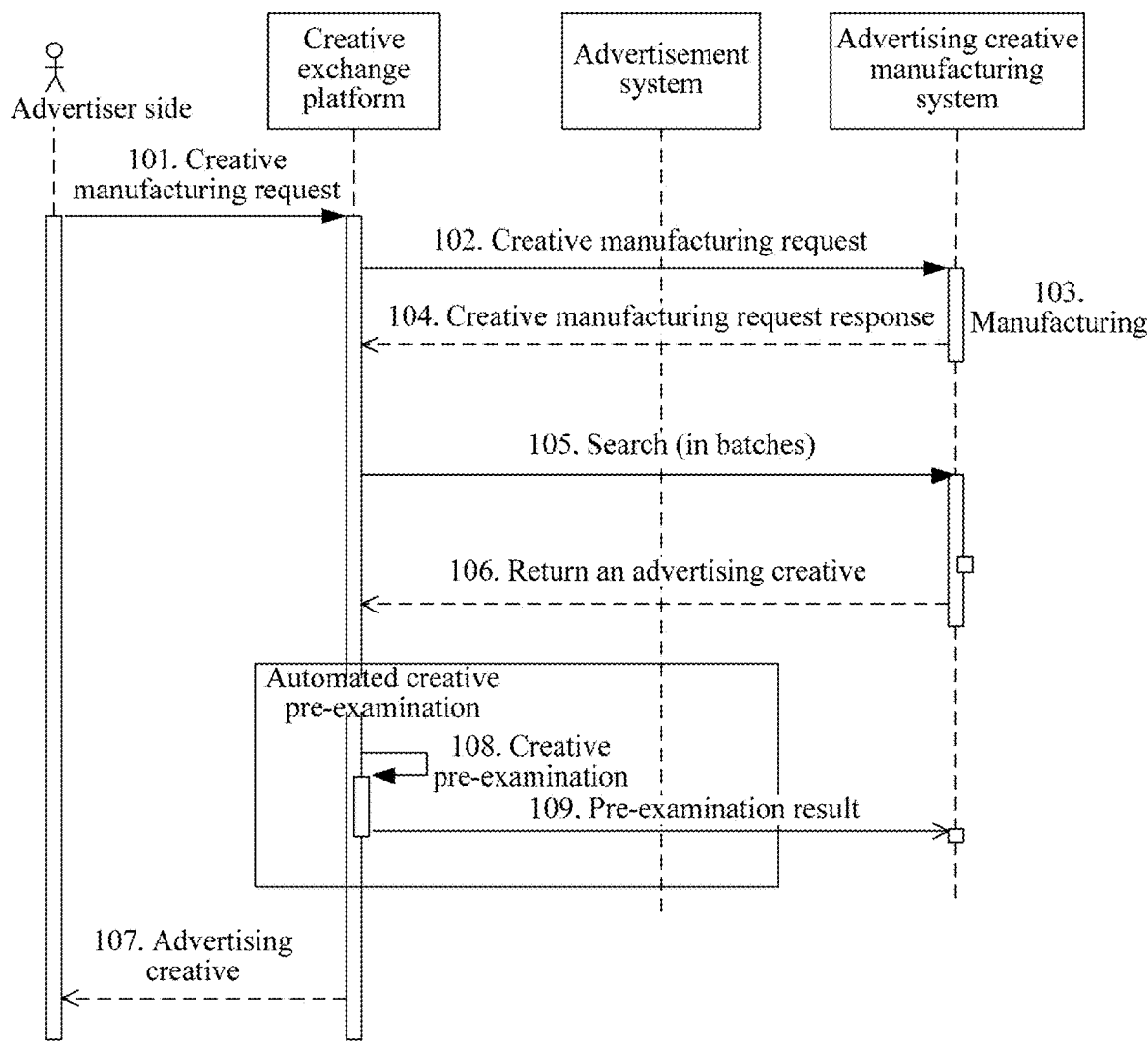

Referring to FIG. 2-1, FIG. 2-1 is an optional schematic flowchart of an advertising creative processing method. An advertiser side sends a creative manufacturing request to a creative exchange platform, to request the creative exchange platform to return an advertising creative to the advertiser side (step 101). Referring to Table 1, Table 1 shows an optional data structure of the creative manufacturing request.

TABLE 1

| Creative manufacturing request |
| --- |
| Advertising creative specification ID |

An advertisement system may provide a plurality of specifications of advertisement slots for the advertiser side to select, and pushes an advertisement for the advertiser side in the advertisement slot selected by the advertiser side. This requires that the advertisement meets a specification of the advertisement slot used for advertisement push. Therefore, the advertiser side adds at least an advertising creative specification identifier such as an ID to the creative manufacturing request for indicating an advertising creative specification needing to be met by the advertising creative manufactured by an advertising creative manufacturing system. Alternatively, referring to Table 2, Table 2 shows a data structure of the creative manufacturing request.

TABLE 2

| Creative manufacturing request |
| --- |
| Advertising creative specification ID |

| Height | Width | Maximum number of bytes | Image type | Description length |
| --- | --- | --- | --- | --- |

When an advertising creative specification maintained by the creative exchange platform cannot meet a requirement of the advertiser side, in this case, an advertising creative ID submitted by the advertiser side by using the creative manufacturing request cannot indicate a required advertising creative specification. In some embodiments, the advertiser side adds at least an advertising creative specification (specific information of the advertising creative specification rather than an advertising creative ID) to the creative manufacturing request submitted to the creative exchange platform. The advertising creative specification varies according to different advertisement slots. An example in which the advertisement slot is used for pushing an image advertisement is used. The advertising creative specification includes the type of an image, the height of the image, the width of the image, the maximum number of bytes occupied by the image in a storage, the minimum length of a title/description (for example, a slogan), and the maximum length of the title/description (for example, a slogan). Another example in which the advertisement slot is used for pushing a video advertisement is used. The specification of the advertisement slot includes the type of a video, the resolution, a time length, and the like.

That the advertiser side sends the creative manufacturing request is continued to be described. The creative manufacturing request submitted by the advertiser side to the creative exchange platform may not carry a material of the advertising creative. In this way, an image in the advertising creative returned by the advertising creative manufacturing system may be random. Alternatively, the advertising creative manufacturing system extracts a material from an advertising creative once manufactured by the advertiser side, to manufacture a new advertising creative and return the new advertising creative. This is different from the foregoing description that the creative manufacturing request only carries the advertising creative specification. In some embodiments, referring to Table 3, Table 3 shows a data structure of the creative manufacturing request.

TABLE 3

| Creative manufacturing request | | | |
| --- | --- | --- | --- |
| Advertising creative specification ID | User information | Material Product information | Jump address |

The creative manufacturing request submitted by the advertiser side to the creative exchange platform may further carry a material of the advertising creative. The advertising creative manufacturing system manufactures, based on the material, the advertising creative, and returns the advertising creative to the advertiser side, thereby ensuring that the advertising creative can improve the recognizability of the advertiser side. For example, the material may include: (1) merchant information: a merchant ID, a merchant name, an industry to which a merchant belongs, and a merchant image; (2) product information: a product ID, a product name, a product classification, and a product image (or any image provided by the advertiser side), where the product classification may be determined according to a product classification definition that is provided by the advertisement system in advance; and (3) a jump address. The advertisement in this embodiment of the present technology is an advertisement pushed in the Internet. The advertisement has a clear objective of information guiding to advertisement audience. The jump address is used for controlling jump of a terminal page after an advertisement pushed to a terminal is concerned by the advertisement audience.

For example, the jump address may point to a page of information such as a propagandized product or service of the advertiser. When the jump address presented in the advertisement is triggered, the terminal interface is jumped to a page corresponding to the jump address. For example, the advertising creative may use a manner of presenting a text prompt about the jump address in the advertisement to prompt the advertisement audience to click the text prompt. After the advertisement audience clicks the text prompt, the terminal loads the page corresponding to the jump address. For another example, the advertising creative binds the jump address with a trigger event of a particular element in the advertisement. After an element such as an image of a product in the advertisement presented in the terminal is triggered, the terminal loads the page corresponding to the jump address, and the advertisement audience can learn of detailed information of the product or purchase the product in the jumped page.

When the creative exchange platform is configured to respond to creative manufacturing requests of different advertiser sides, the creative exchange platform and the advertising creative manufacturing system need to distinguish between the creative manufacturing requests from different advertiser sides. In some embodiments, the creative exchange platform responds to the creative manufacturing requests of different advertiser sides. Correspondingly, referring to Table 4, Table 4 shows a data structure of the creative manufacturing request.

TABLE 4

Creative manufacturing request

| Advertising creative specification ID | Material | Advertiser side ID/advertisement system service ID |
| --- | --- | --- |

The creative manufacturing request sent by the advertiser side further carries an advertiser side identifier such as an advertiser side ID, so that the creative exchange platform and the advertising creative manufacturing system distinguish, based on advertiser side IDs (the advertiser side IDs may be allocated by the creative exchange platform to the advertiser sides), between the creative manufacturing requests from different advertiser sides. Alternatively, different advertiser sides each have a unique service identifier such as an ID in the advertisement system. The creative manufacturing request sent by the advertiser side may further carry the service ID of the advertiser side in the advertisement system, so that the creative exchange platform and the advertising creative manufacturing system distinguish, based on service IDs of the advertiser sides, between the creative manufacturing requests from different advertiser sides.

When the advertiser side has a further requirement (for example, a specified number of manufactured advertising creatives or a template for manufacturing the advertising creative) on the advertising creative needing to be manufactured by the advertising creative manufacturing system, in some embodiments, the advertiser side sets a creative manufacturing configuration item in the creative manufacturing request that is to be submitted to the advertising creative manufacturing system. Referring to Table 5, Table 5 shows a data structure of the creative manufacturing request.

TABLE 5

Creative manufacturing request

| Advertising creative specification ID | Material | Advertiser side ID/advertisement system service ID | Creative manufacturing configuration item |
| --- | --- | --- | --- |

For example, the creative manufacturing configuration item includes at least one of the following:

(1) An identifier such as an ID of a creative supplier needing to be preferentially used by the advertiser side.

When the advertiser side adds the creative manufacturing configuration item to the creative manufacturing request, the creative exchange platform preferentially requests the advertising creative to an advertising creative manufacturing system corresponding to the identifier, and preferentially returns, to the advertiser side, an advertising creative returned by the advertising creative manufacturing system. In some embodiments, when the advertiser side does not add the creative manufacturing configuration item to the creative manufacturing request, the creative exchange platform requests a default advertising creative manufacturing system (for example, all creative exchange platforms or some creative exchange platforms such as an advertising creative manufacturing system once manufactured an advertising creative for the advertiser side) for the advertising creative.

(2) An identifier of a creative supplier needing to be used by the advertiser side.

When the advertiser side adds the creative manufacturing configuration item to the creative manufacturing request, the creative exchange platform only requests the advertising creative to an advertising creative manufacturing system corresponding to the identifier, and preferentially returns, to the advertiser side, an advertising creative returned by the advertising creative manufacturing system. In some embodiments, when the advertiser side does not add the creative manufacturing configuration item to the creative manufacturing request, the creative exchange platform requests a default advertising creative manufacturing system (for example, all creative exchange platforms, or some creative exchange platforms such as an advertising creative manufacturing system once manufactured an advertising creative for the advertiser side) for the advertising creative.

(3) The target number of advertising creatives required by the advertiser side (e.g., the total quantity of unique creatives required by the advertiser side that conforms to the specification provided by the advertiser side).

When the advertiser side adds the creative manufacturing configuration item to the creative manufacturing request, the creative exchange platform requests each advertising creative manufacturing system for the target number of advertising creatives, and returns the target number of advertising creatives to the advertiser side. In some embodiments, when the advertiser side does not add the creative manufacturing configuration item to the creative manufacturing request, the creative exchange platform requests a default advertising creative manufacturing system (for example, all creative exchange platforms, or some creative exchange platforms such as an advertising creative manufacturing system once manufactured an advertising creative for the advertiser side) for the advertising creative.

(4) An advertising creative template (or an identifier such as an ID of the advertising creative template) needing to be used by the advertiser side.

The advertising creative template is used for indicating to the advertising creative manufacturing system template used for manufacturing the advertising creative. In some embodiments, the advertiser side needs to use an advertising creative template not existing in the creative exchange platform (or the advertising creative manufacturing system) to manufacture the advertising creative, and a manner of adding the advertising creative template to the creative manufacturing request is used to indicate to the creative exchange platform the template needing to be used for manufacturing the advertising creative. The creative exchange platform requests the advertising creative manufacturing system to manufacture, based on the advertising creative template submitted by the advertiser side, the advertising creative and returns the advertising creative to the advertiser side.

In some embodiments, when the advertiser side needs to use an existing advertising creative template in the creative exchange platform (or the advertising creative manufacturing system) to manufacture the advertising creative, a manner of adding an ID of the advertising creative template to the creative manufacturing request is used for indicating to the creative exchange platform the template needing to be used for manufacturing the advertising creative to manufacture the advertising creative and returns the advertising creative to the advertiser side.

(5) An upper time limit of returning the advertising creative.

The upper time limit is used for indicating a maximum delay of returning the advertising creative to the advertiser side. When the advertiser side adds the creative manufacturing configuration item to the creative manufacturing request, the creative exchange platform requests each advertising creative manufacturing system for the advertising creative, and returns the advertising creative to the advertiser side within the upper time limit.

Figures 2, 3:
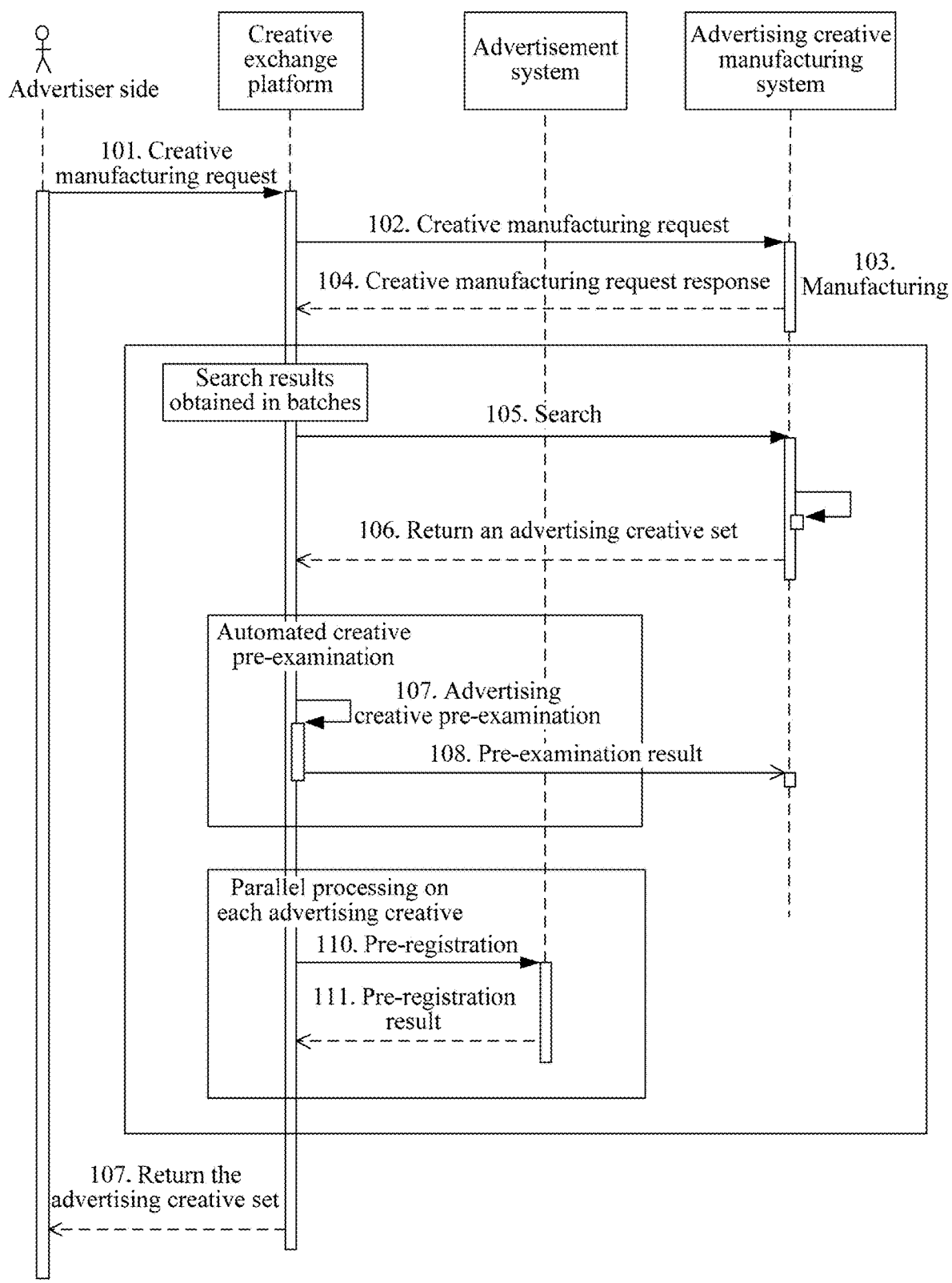

Referring to FIG. 3, FIG. 3 is an optional schematic diagram of a submission interface for submitting the creative manufacturing request by the advertiser side. The advertising creative specification ID is essential information that is in the creative manufacturing request and submitted to the creative exchange platform. When advertisement audience is guided to concern a particular page on the advertiser side, a jump address corresponding to the particular page is also essential information that is in the creative manufacturing request and submitted to the creative exchange platform. Therefore, an advertisement pushed based on the advertising creative returned by the advertising creative manufacturing system can achieve a jumping function on the page of the advertisement audience, and meets a specification of an advertisement slot selected by the advertiser side for advertisement push.

FIG. 3 is continued to be described. In some embodiments, when the creative exchange platform is configured to respond to creative manufacturing requests of a plurality of user sides (e.g., personnel of advertisers that requests creatives to be manufactured, not the end users or individual consumers that see the advertisements on their own personal terminals), the advertiser side further needs to fill an advertiser side ID and an advertisement system service ID in the creative manufacturing request shown in FIG. 3, so that the creative exchange platform can distinguish between creative manufacturing requests of different advertiser sides. In addition, to distinguish between different creative manufacturing requests successively sent by a same advertiser side and to distinguish between creative manufacturing requests from different advertiser sides, the creative exchange platform allocates an creative manufacturing request identifier such as an ID to each creative manufacturing request, adds the creative manufacturing request ID to the creative manufacturing request, and sends the creative manufacturing request ID to the advertising creative manufacturing system.

Figures 2, 3, 4:
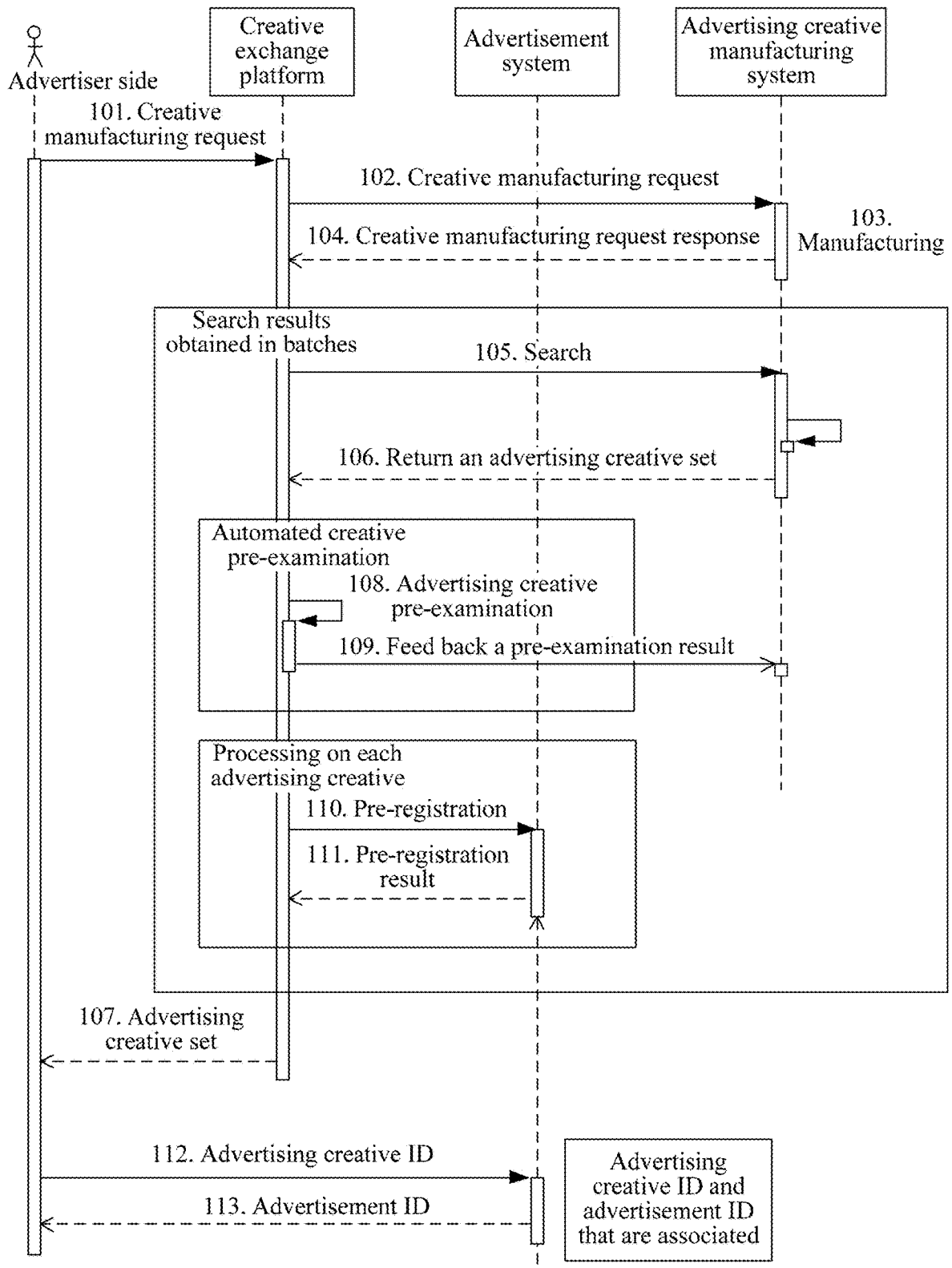

Processing after the creative exchange platform receives a creative manufacturing request from one advertiser side is continued to be described. Processing after a plurality of creative manufacturing requests (regardless of the creative manufacturing requests are from a same advertiser side or different advertiser sides) is received may be implemented according to understanding of the following recordation. The creative exchange platform processes the creative manufacturing request from the advertiser side. As shown in FIG. 4, the creative exchange platform converts a creative specification ID carried in the creative manufacturing request into specific information of a corresponding creative specification, for example, fills information such as an advertiser side ID, an advertisement system service ID, or a creative manufacturing request ID, and sends the processed creative manufacturing request to the advertising creative manufacturing system (step 102).

The advertising creative specification maintained by the creative exchange platform is provided with a corresponding advertising creative specification ID on the advertiser side. In some embodiments, if the advertiser side submits information about the creative specification by adding the advertising creative specification ID to the creative manufacturing request, the creative exchange platform fills specific specification information corresponding to the advertisement specification ID in the creative manufacturing request. Using an example in which the advertiser side pushes an image advertisement in the advertisement position, FIG. 4 is an optional schematic diagram of a creative manufacturing request filled with specific specification information. Compared with FIG. 3, specific information of the advertising creative specification is filled in the creative manufacturing request by the creative exchange platform.

To shorten time of returning the advertising creative to the advertiser side, in some embodiments, if the creative exchange platform needs to request a plurality of advertising creative manufacturing systems for the advertising creative, the creative exchange platform simultaneously sends a creative manufacturing request to the plurality of advertising creative manufacturing systems in parallel, to trigger the plurality of advertising creative manufacturing systems to simultaneously start manufacturing advertising creatives in parallel (step 103). Therefore, time of returning the advertising creative to the creative exchange platform by the advertising creative manufacturing system is maximally shortened, thereby maximally shortening a period from submission of the creative manufacturing request by the advertiser side to returning of the advertising creative to the advertiser side.

As described above, the creative exchange platform triggers the advertising creative manufacturing system to manufacture the advertising creative by sending the creative manufacturing request to the advertising creative manufacturing system. In some embodiments, when starting manufacturing the advertising creative (step 103) (before, during, and after the manufacturing), the creative manufacturing system further responds to the creative manufacturing request received from the creative exchange platform (step 104). Referring to Table 6, Table 6 shows an optional data structure of a creative manufacturing request response.

TABLE 6

Creative manufacturing request response

| Creative manufacturing request ID | Number of returned advertising creatives | Batch | Delay | Wait time |
|---|---|---|---|---|

For example, the creative manufacturing request response includes at least one of the following:

(1) a creative manufacturing request ID, which is used for indicating the creative manufacturing request responded by the advertising creative manufacturing system;

(2) the number of returned advertising creatives, which is used for indicating the total number of advertising creatives to be returned by the advertising creative manufacturing system to the creative exchange platform; and (3) batches, including:

(3.1) the number of the batches, used for indicating the total number of batches that can be used by the creative exchange platform for searching the advertising creative manufacturing system for advertising creatives the advertiser side requests to manufacture, where the creative exchange platform searches the advertising creative manufacturing system in batches for whether the advertising creatives the advertiser side requests to manufacture have been manufactured, and each batch is used for searching for whether some of the advertising creatives the advertiser side requests to manufacture have been manufactured; and (3.2) the size of each batch, used for indicating the number of advertising creatives in the advertising creative manufacturing system that are searched for by the creative exchange platform in each batch, where the numbers of advertising creatives searched for in the batches may be different or may be the same; in consideration that the proficiency of the advertising creatives searched for in the batches is different, the search number of each batch needs to be additionally indicated, and therefore, if the numbers of advertising creatives searched for in the batches are the same, processing of search in batches between the creative exchange platform and the advertising creative manufacturing system is greatly simplified, and an example in which the sizes of the batches are the same is used for description subsequently.

In some embodiments, to simplify the complexity of an interaction procedure, the advertising creative manufacturing system does not return the creative manufacturing request response to the creative exchange platform. Alternatively, when the creative exchange platform does not receive (for example, within preset time after the creative manufacturing request is sent) the creative manufacturing request response from the advertising creative manufacturing system, the creative exchange platform sets default values to (2): the number of returned advertising creatives and (3): the batches.

The processing of manufacturing advertising creatives by an advertisement supply system is continued to be described. The advertising creative manufacturing system manufactures advertising creatives according to the creative manufacturing request sent by the creative exchange platform, and the advertising creative manufacturing system uses a material indicated by the creative manufacturing request to manufacture advertising creatives meeting the advertising creative specification. In addition, the advertising creative meets the creative manufacturing configuration item carried in the creative manufacturing request. For example, if the creative manufacturing request includes the following creative manufacturing configuration items: the identifier such as the ID of the creative supplier needing to be used, the target number of advertising creatives, the ID of the advertising creative template needing to be used by the advertiser side, and the upper time limit of returning the advertising creative, an advertising creative manufacturing system corresponding to the creative supplier ID preferentially uses the corresponding advertising creative template to manufacture the target number of advertising creatives, and completes manufacturing of the advertising creatives before returning time expires. In this way, time of returning the advertising creative to the creative exchange platform is maximally shortened, thereby reducing the period from submission of the creative manufacturing request by the advertiser side to returning of the advertising creative to the advertiser side. In addition, because the advertising creative is manufactured by the advertising creative manufacturing system based on the advertisement specification, a subsequent problem that an advertising creative needs to be manufactured again due to that an advertisement pushed by the advertisement system by using the advertising creative does not meet the specification of the advertisement slot pre-selected by the advertiser side is avoided.

To improve the efficiency of returning the advertising creative to the creative exchange platform by the advertising creative manufacturing system, in some embodiments, the creative exchange platform sends the creative manufacturing request to a plurality of advertising creative manufacturing systems, to trigger the plurality of advertising creative manufacturing systems to simultaneously start manufacturing advertising creatives. For the plurality of advertising creative manufacturing systems to which the creative manufacturing request is sent, the creative exchange platform searches each advertising creative manufacturing system in batches for whether advertising creatives the advertiser side requests to manufacture have been manufactured (step 105), so that after completing manufacturing of an advertising creative searched by the creative exchange platform in any respective batch, the advertising creative manufacturing system returns an advertising creative set included in the corresponding batch to the creative exchange platform as a search result of the batch (step 106). That the creative exchange platform searches, in parallel and in batches, the advertising creative manufacturing system for the advertising creatives, so that the advertising creative manufacturing system returns, after completing manufacturing of an advertising creative set in any searched batch, the advertising creative set is described below with reference to different specific examples.

Specific Example (1): Pagination Long-Polling

Each advertising creative manufacturing system stores, in a database in a manner of paging (which may also be referred to as pagination), advertising creatives the advertiser side requests to manufacture. Each page stores some of the advertising creatives the advertiser side requests to manufacture and the numbers of advertising creatives stored in pages are the same. The creative exchange platform establishes a plurality of HTTP protocol-based connections according to the number of pages (for example, establishing a corresponding number of connections to the advertising creative manufacturing system). After wait time (which is indicated by the advertising creative manufacturing system by using the creative manufacturing response or is set to a default value when the creative exchange platform does not receive a creative manufacturing request response) expires, the creative exchange platform searches, in parallel by using the established different connections, the advertising creative manufacturing systems for whether advertising creatives included in different pages have been manufactured. One connection is used for searching for advertising creatives included in one page, and pages searched for by using different connections are different. When manufacturing of advertising creatives included in a page in the advertising creative manufacturing system that is searched for by the creative exchange platform by using a connection is not completed, the connection is maintained, and the creative exchange platform does not release the connection until the advertising creatives in the searched page is manufactured and is returned to the creative exchange platform by using the connection. That is, one connection is only used for searching for advertising creatives included in one page and is used by the advertising creative manufacturing system for returning the searched advertising creatives to the creative exchange platform.

Figures 2, 3, 4, 5:
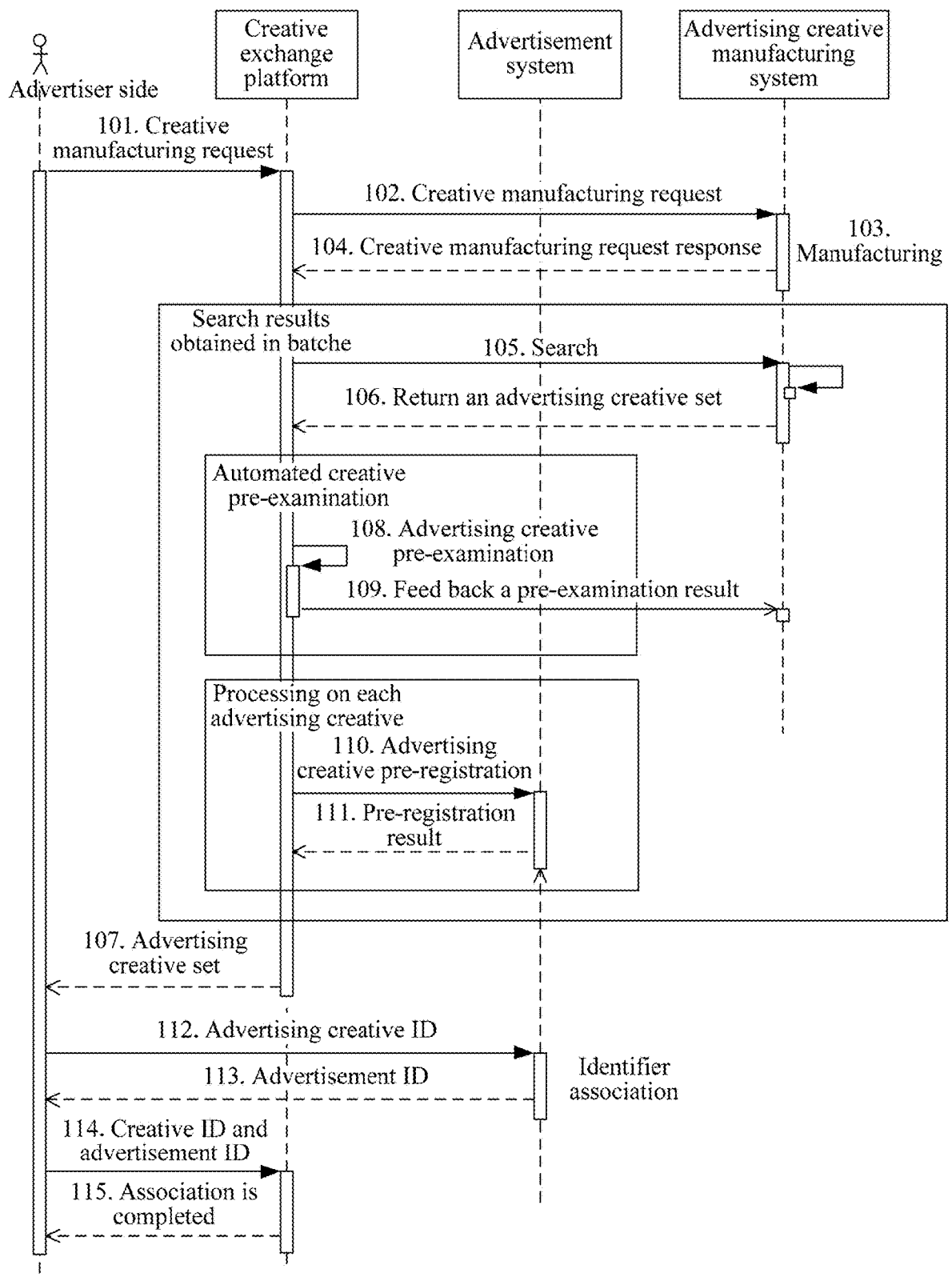
Figures 1, 5:
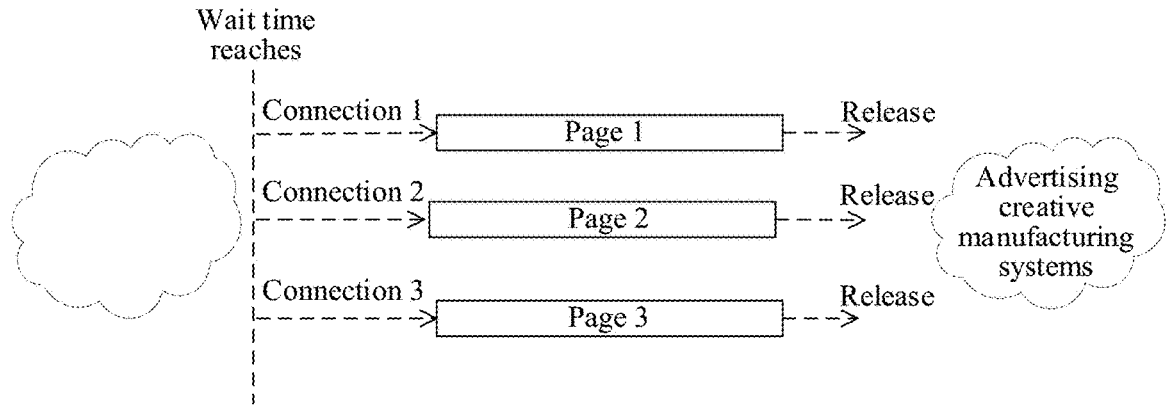
Figures 2, 5:
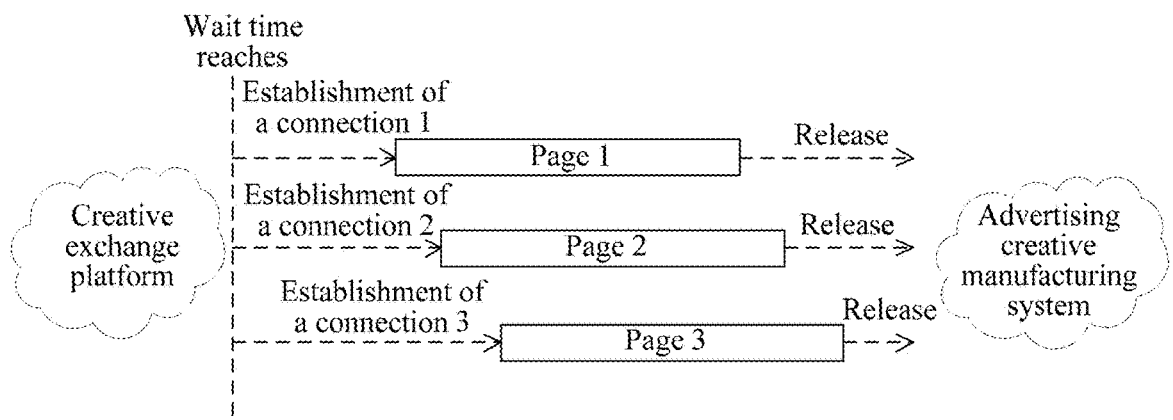

The parallel above means that when the wait time expires, the creative exchange platform simultaneously searches, by using different connections, the advertising creative manufacturing system for advertising creatives included in different pages. FIG. 5-1 is exemplarily a schematic diagram of searching a creative manufacturing system for advertising creatives by the creative exchange platform. The creative exchange platform establishes a plurality of connections to the advertising creative manufacturing system after the wait time expires, and simultaneously searches, by using the plurality of connections, the advertising creative manufacturing system for advertising creatives included in a page. Using a connection 1 as an example, an advertising creative manufacturing system is searched, by using the connection 1, for advertising creatives included in a page 1. If the advertising creatives are not manufactured, the connection 1 is maintained. After the advertising creative manufacturing system returns, by using the connection 1, advertising creatives included in the page 1, the connection 1 is released. Processing of a connection 2 and a connection 3 is similar to that of the connection 1.

Alternatively, the parallel above may mean that the creative exchange platform may asynchronously search, by using different connections, the advertising creative manufacturing system for advertising creatives included in different pages. Referring to FIG. 5-2, FIG. 5-2 is exemplarily an optional schematic diagram of searching a creative supply system for advertising creatives by the creative exchange platform. After the wait time expires, and after the creative exchange platform searches, by using a connection (a connection 1), the advertising creative manufacturing system for advertising creatives included in a page (a page 1), the advertising creative manufacturing system may be subsequently searched, by using another connection (for example, a connection 2 or a connection 3), for advertising creatives included in another page (a page 2 or a page 3), and there is no need to wait for the advertising creatives included in the first searched page (the page 1) to be returned to the creative exchange platform. That is, time of searches initiated by using the connections may be different and are not mutually affected, so that the efficiency of returning the advertising creative to the creative exchange platform by the advertising creative manufacturing system can be maximally improved.

An optional data structure of a pagination search request is shown in Table 7.

TABLE 7

| Pagination search request | | |
| --- | --- | --- |
| Creative manufacturing request ID | Pagination ID | Page size |

For example, the pagination search request includes:

(1) a creative manufacturing request ID, used for instructing to search for advertising creative requested, by using a corresponding creative manufacturing request, to be manufactured;

(2) a pagination ID, used for indicating to the advertising creative manufacturing system a sequence number of a page requested to be searched for; and (3) the page size, used for indicating to the advertising creative manufacturing system the number of advertising creatives included in a page.

Specific Example (2): Search by Means of Connection Reuse

The advertising creative manufacturing system stores, in a database in a manner of paging, advertising creatives the advertiser side requests to manufacture. Each page stores some of the advertising creatives the advertiser side requests to manufacture and the numbers of advertising creatives stored in pages are the same.

The creative exchange platform establishes a plurality of web socket-based connections to the advertising creative manufacturing system, and the connections may carry different sessions. The creative exchange platform searches, in parallel by using the sessions in the established different connections, the advertising creative manufacturing system for advertising creatives included in corresponding batches. After wait time (which is indicated by the advertising creative manufacturing system by using the creative manufacturing request, or is set to a default value when the creative exchange platform does not receive a creative manufacturing request response) expires, the advertising creative manufacturing system is searched, in parallel by using the sessions in the established different connections, for whether advertising creatives included in different pages have been manufactured. A session carried in one connection is used for searching for advertising creatives included in one page. One connection only carries one session at any time, and sessions carried in different connections are used for searching for different pages.

When advertising creatives included in a page in the advertising creative manufacturing system that is searched for by the creative exchange platform by using a session carried in a connection is not manufactured, the session carried in the connection is maintained. After the advertising creatives included in the searched page are manufactured and returned to the creative exchange platform by using the connection, the creative exchange platform establishes a new session (which replaces the old session) in the connection to continue to search for whether advertising creatives included in another page (that is, a page has not been searched for) have been manufactured. That is, the creative exchange platform searches, by using different sessions in the connection, advertising creatives included in different pages, thereby implementing reuse of the connection.

Figures 1, 6:
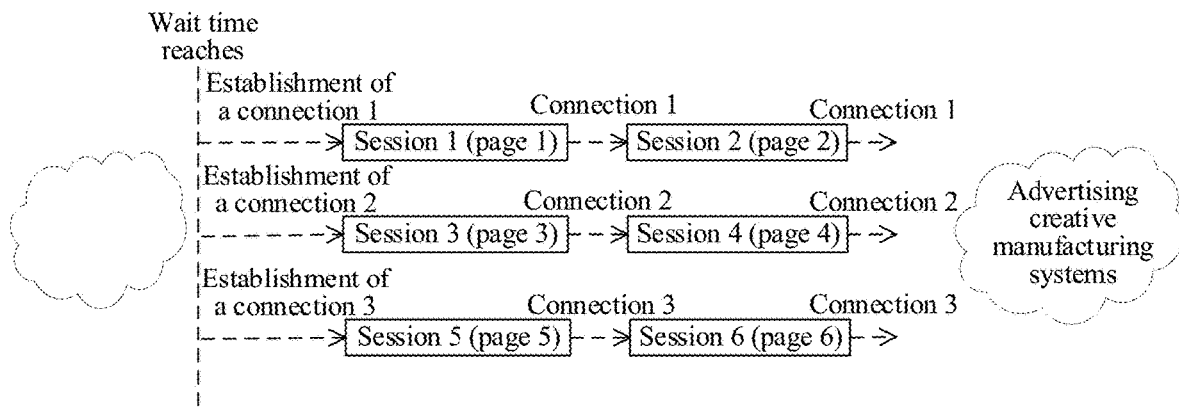
Figures 2, 6:
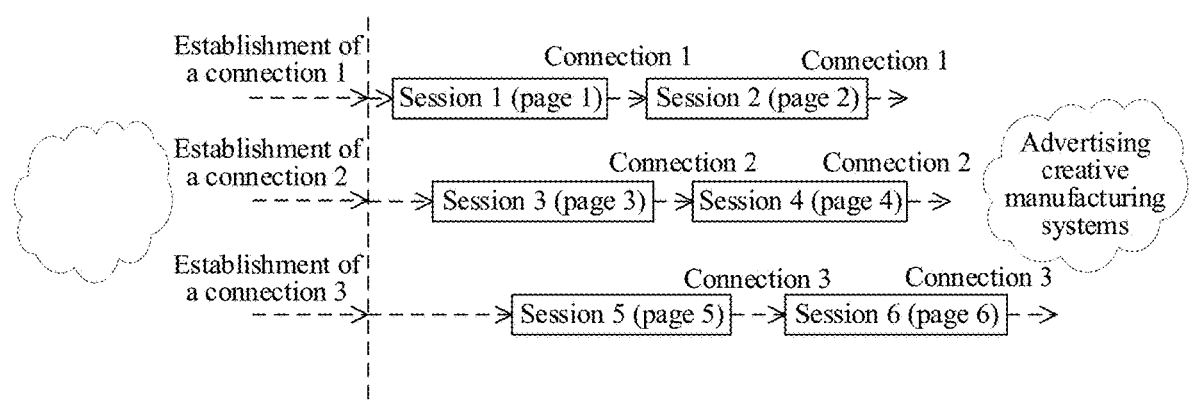

The parallel above means that when the wait time expires, the creative exchange platform may simultaneously search, by using sessions carried in different connections, the advertising creative manufacturing system for advertising creatives included in different pages. Referring to FIG. 6-1, FIG. 6-1 is an optional schematic diagram of searching a creative supply system for advertising creatives by the creative exchange platform. Advertising creatives included in a page 1 is searched for by using a session 1 carried in a connection 1; at the same time, advertising creatives included in a page 3 is searched for by using a session 3 carried in a connection 2, and advertising creatives included in a page 5 is searched for by using a session 5 carried in a connection 3. After the advertising creatives included in the page 1 are returned, the connection 1 is reused, and a session carried in the connection 1 is used for searching for advertising creatives included in a page 2. Processing of the connection 2 and the connection 3 is similar to that of the connection 1. Different sessions carried in the connection may be defined by using a particular frame.

Alternatively, the parallel above may mean that when the wait time expires, the creative exchange platform asynchronously searches, by using sessions carried in different connections, the advertising creative manufacturing system for advertising creatives included in different pages. Referring to FIG. 6-2, FIG. 6-2 is an optional schematic diagram of searching a creative supply system for advertising creatives by the creative exchange platform. Advertising creatives included in a page 1 are searched for by using a session 1 carried in a connection 1; subsequently, advertising creatives included in a page 3 are searched for by using a session 3 carried in a connection 2; subsequently, advertising creatives included in a page 5 are searched for by using a session 5 carried in a connection 3. After the advertising creatives included in the page 1 are returned, the connection 1 is reused. A session 2 (which replaces the session 1) carried in the connection 1 is used for searching for advertising creatives included in a page 2. Processing of the connection 2 and the connection 3 is similar to that of the connection 1. Different sessions carried in the connection may be defined by using a particular frame. In addition, the session is always carried in one connection. In this way, searches for different pages are not interfered with each other. Different sessions carried in the connection may be defined by using a particular frame (for example, an end confirmation frame or an session end frame).

With reference to FIG. 6-2, it can be learned that after the advertising creative manufacturing system is searched, by using a session carried in a connection, for advertising creatives included in a page, the advertising creative manufacturing system may be subsequently searched, at any time by using a session carried in another connection, for advertising creatives included in another page, and there is no need to wait for the advertising creatives included in the first searched page to be returned to the creative exchange platform. That is, searches initiated by the creative exchange platform by using sessions carried in connections are not mutually affected, so that the efficiency of returning the advertising creatives to the creative exchange platform by the advertising creative manufacturing system can be maximally improved.

A case in which the creative exchange platform receives advertising creatives that are included in any respective batch and returned by the advertising creative manufacturing system is continued to be described. The creative exchange platform sends the advertising creatives included in any respective batch to the advertiser side.

In some embodiments, the creative exchange platform sends advertising creatives included in any respective batch to the advertiser side (step 107). In some embodiments, before sending the advertising creative included in any respective batch to the advertiser side, the creative exchange platform further performs parallel processing on the advertising creatives that are included in any respective batch and returned by the advertising creative manufacturing system.

Referring to FIG. 2-2, the creative exchange platform further performs parallel processing on the advertising creative that is included in any respective batch and returned by the advertising creative manufacturing system. The parallel processing is described below with reference to specific examples.

Specific example (1): advertising creative pre-examination.

The creative exchange platform performs pre-examination on each advertising creative returned by the advertising creative manufacturing system (step 108), that is, verifies whether each advertising creative meets an advertising creative specification submitted by the advertiser side, and returns a verification result (that is, a pre-examination result) of the advertising creative, for example, whether the manufactured advertising creative meets or does not meet the advertising creative specification submitted by the advertiser side, to the advertising creative manufacturing system (step 109).

Specific example (2): advertising creative pre-registration.

Referring to FIG. 2-3, the creative exchange platform performs pre-registration processing on each advertising creative (step 110): (1) locally storing a material (for example, an image indicated by an image address or audio indicated by an audio address) indicated by each advertising creative in the creative exchange platform and (2) generating a preview of each advertising creative, sending the preview, the material, and an advertising creative identifier to the advertisement system, so that the advertisement system registers the material, the preview, and the advertising creative identifier of the received advertising creative with the advertiser side (by using an advertiser side ID or an advertisement system service ID) in an associated manner to form an association relationship, and returning a pre-registration result (step 111).

In some embodiments, after the creative exchange platform returns, to the advertiser side, an advertising creative set returned by the advertising creative manufacturing system, referring to FIG. 2-4, the advertiser side logs in to the advertisement system according to the advertiser side ID or the advertisement system service ID, views, in the advertisement system, the preview and the advertising creative identifier of the advertising creative registered with the advertisement system by the creative exchange platform for the advertiser side, selects, according to the preview of the advertising creative, an identifier of an advertising creative (a target advertising creative) needing to be used for advertisement push, and submits the corresponding advertising creative identifier to the advertisement system (step 112). The advertisement system performs advertisement push according to the advertising creative identifier that is submitted by the advertiser side and by using the corresponding advertising creative in combination with the pre-registered material, and returns, to the advertiser side, an ID of an advertisement pushed by using the advertising creative selected by the advertiser side (step 113).

The advertiser side has a requirement on searching for effect data (for example, a click rate or a click conversion rate) of performing advertisement push by using the selected advertising creative. In some embodiments, the advertiser system uses the advertising creative selected by the advertiser side to push an advertisement, and returns an ID of the pushed advertisement to the advertiser side. When the advertiser side receives the ID that is returned by the advertisement system and of the advertisement pushed by using the advertising creative selected by the advertiser side, referring to FIG. 2-5, for all advertisements pushed by the advertiser side by using the advertisement system, the advertiser side submits advertisement IDs to the creative exchange platform (step 114). The creative exchange platform associates the advertisement IDs with IDs of advertising creatives used for pushing the advertisements, to form association relationships between advertisements pushed by the advertiser side in the advertisement system and the advertising creatives customized by the advertiser side (step 115). Subsequently, when the advertiser side needs to search for effect data of an advertisement pushed by using an advertising creative, the advertiser side submits, to the creative exchange platform, an identifier of the advertising creative (a target advertising creative) needing to be searched for, the creative exchange platform determines, based on the identifier of the target advertising creative that is submitted by the advertiser side and an association relationship, an identifier of a target advertisement pushed by using the target advertising creative, and searches, based on the identifier of the target advertisement, for push effect data of the target advertisement. Push effect data of push effects obtained by using different advertising creatives is learned of, so as to help the advertiser side to know different push effects brought by using different advertising creatives, so that the advertiser side can select an optimal advertising creative in subsequent advertisement push, and preferentially use or only use the optimal advertising creative in the advertisement system for advertisement push. In addition, during subsequent advertising creative manufacturing, an advertising creative request may be used for instructing an advertising creative manufacturing system manufacturing the optimal advertising creative to manufacture an advertising creative, thereby ensuring the effects of subsequent advertisement push.

Figure 7:
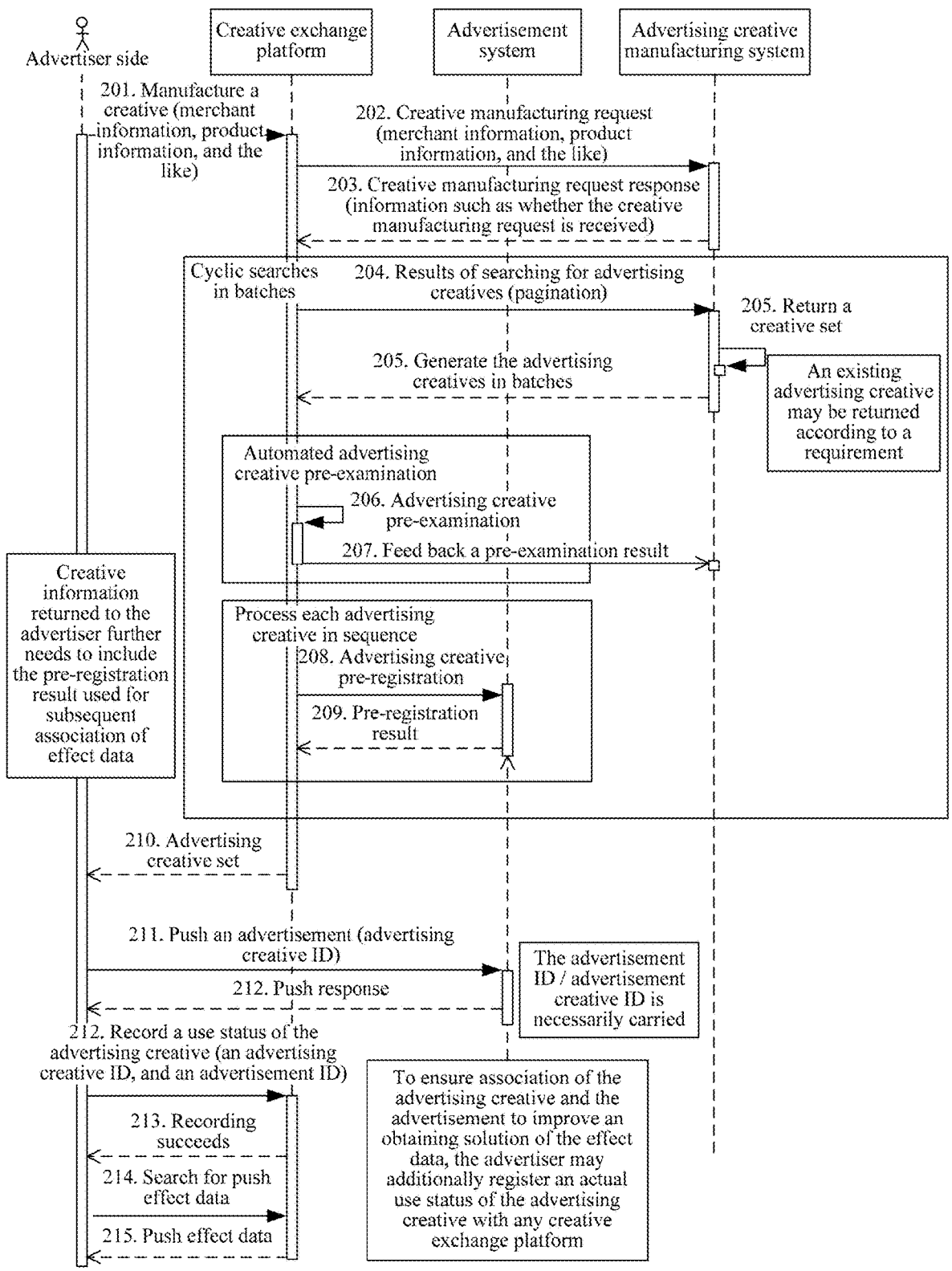
FIG. 7 is an optional schematic flowchart of an advertising creative processing method according to an embodiment of the present technology.

A specific example in which an advertiser side customizes an advertising creative to push an image advertisement is further used for description. FIG. 7 is another optional schematic flowchart of advertising creative processing. The advertiser side sends a creative manufacturing request to a creative exchange platform (step 201).

A data structure of the creative manufacturing request includes an advertiser side ID and a Tencent social advertisement platform side ID that are used for determining the identity of the advertiser side. In addition, the data structure further includes merchant information, product information, and an advertisement landing page (that is, a jump address), so as to require that a returned advertising creative includes the foregoing content. To ensure that the advertising creative returned to the advertiser side meets a specification (an advertising creative specification) of an advertisement slot that is pre-selected by the advertiser side, the advertiser side further adds an advertising creative specification ID to the creative manufacturing request to instruct that the returned advertising creative meets an advertising creative specification corresponding to the advertising creative specification ID. In addition, the advertiser side may further submit a creative configuration item (if the creative configuration item is not submitted, the creative exchange platform fills a default value in the received creative manufacturing request) by using the creative manufacturing request, to indicate an ID of a preferred creative supplier for manufacturing the advertising creative, a template for manufacturing the advertising creative, the number of advertising creatives expected to be returned, and return time.

After the creative exchange platform receives the creative manufacturing request submitted by the advertiser side, in an optional data structure of the creative manufacturing request, a creative manufacturing request sequence number is added to the creative manufacturing request, and specific information of the advertising creative specification corresponding to the advertising creative specification ID is added to the creative manufacturing request, including information such as the title length (the maximum length and the minimum length), the description length (the maximum length and the minimum length), the image type, the image height, the image width, and the maximum number of bytes of an image. After processing the creative manufacturing request, the creative exchange platform sends the creative manufacturing request to a plurality of advertising creative manufacturing systems (step 202, where if the creative manufacturing request indicates an ID of a preferred creative supplier, the creative manufacturing request is further sent to a corresponding advertising creative manufacturing system).

The advertising creative manufacturing system returns a creative manufacturing request response to the creative exchange platform (step 203). The creative manufacturing request response carries a creative manufacturing request ID to indicate the responded creative manufacturing request, and the creative manufacturing request response is used for indicating to the creative exchange platform whether the creative manufacturing request is accepted. When the creative manufacturing request is accepted, the number of advertising creatives to be returned to the creative exchange platform is further returned. The creative exchange platform may search, in a paging search manner, the advertising creative manufacturing system for information such as the number of advertising creatives each time.

The creative exchange platform searches the advertising creative manufacturing system for advertising creatives by means of pagination (step 204). In a data structure of a pagination search request, the pagination search request includes a pagination search request sequence number, the page number of a searched page, and the number of advertising creatives included in the page.

The advertising creative manufacturing system generates advertising creatives in batches according to the advertising creative specification carried in the creative manufacturing request, so as to ensure that a returned advertising creative meets the specification of the advertisement slot used by the advertiser side for advertisement push. When an advertising creative included in a page searched for by the creative exchange platform is manufactured, an advertising creative set is returned as a search result (step 205). In a data structure of the search result, the search result includes a returned advertising creative ID, an ID of a template used for manufacturing the advertising creative, an advertisement title, and image information (for example, an image address and the image MD5). The advertising creative manufacturing system may further return, according to a requirement, a historical advertising creative that is once generated to the creative exchange platform as a search result.

For the advertising creative returned by the advertising creative manufacturing system to the creative exchange platform, the creative exchange platform performs automated advertising creative pre-examination (step 206), for example, verifying whether the advertising creative meets the advertising creative specification, and sending a pre-examination result to the advertising creative manufacturing system (step 207).

In addition to performing pre-examination on the advertising creative returned by the advertising creative manufacturing system, the creative exchange platform further performs pre-registration processing on each advertising creative in the advertisement system: locally storing an image in the creative exchange platform according to an image address indicated in the advertising creative, and sending a preview of the advertising creative and an advertising creative ID to the advertisement system for registration (step 208), so that the advertisement system associates the advertising creative ID with an advertisement ID, and returns a pre-registration result (step 209).

After pre-examination and pre-registration processing is performed on the advertising creative returned by the advertising creative manufacturing system, in a data structure of the returned advertising creative, the creative exchange platform returns the advertising creative, the advertising creative ID (which is an identifier used by a push end of the advertisement system for identifying the advertising creative), and the advertising creative preview to the advertiser side (step 210), so that the advertiser side selects, based on the preview, an advertising creative needing to be used for advertisement push, and provides the advertisement system with an ID of the advertising creative needing to be used for advertisement push (step 211). When returning an advertisement push response to the advertiser side (step 212), the advertisement system needs to add the advertising creative ID and an advertisement ID, so that the advertiser side records a use status of the advertising creative in the creative exchange platform (step 212), the creative exchange platform returns a recording success result to the advertiser side (step 213).

The creative exchange platform maintains the association relationship between the advertising creative ID and the advertisement ID, and the creative exchange platform may further obtain push effect data (for example, a click rate or a click conversion rate) of different advertisements from the advertisement system. The advertiser side requests the creative exchange platform to search for effect data of advertisement push performed by using an advertising creative (step 214), and adds an advertising creative ID to a search request. The creative exchange platform returns the push effect data of a corresponding advertisement to the advertiser side (step 215) as a reference of subsequent advertisement push and advertising creative manufacturing for the advertiser side. For example, when an advertising creative is to be manufactured again, a supplier of an advertising creative having a high click rate is preferentially selected.

In FIG. 7, the creative exchange platform returns a preview of an advertising creative and an advertising creative ID of a corresponding push end to the advertiser side. When needing to push an advertisement by using a selected advertising creative, the advertiser side does not need to locally upload the advertising creative from the advertiser side to the advertisement system. Because the creative exchange platform has performed pre-registration on the advertising creative (including the advertising creative ID) in the advertisement system, the advertisement system can push, based on the advertising creative ID provided by the advertiser side, the advertisement by using the corresponding advertising creative.

In an exceptional case, when the creative exchange platform cannot implement pre-registration on an advertising creative at a push end of the advertisement system, in an alternative solution, the creative exchange platform registers the creative with the creative exchange platform side to obtain a creative exchange platform side creative ID, and returns the creative exchange platform side creative ID and an original image together to the advertiser side. The advertiser side needs to locally upload a creative image during advertisement push.

In FIG. 7, the association relationship between the advertisement ID and the advertising creative ID is registered with the creative exchange platform by the advertiser side. For risks of data integrity and data correctness that exist in the creative exchange platform, in an alternative solution, the creative exchange platform may maintain the association relationship in the advertisement system, to ensure the data integrity and the data correctness.

In FIG. 7, communication between the creative exchange platform and the advertising creative manufacturing system on a creative supplier side is in a HTTP protocol-based long-polling pagination pulling manner. Each connection is used for pulling an advertising creative in a page. After the advertising creative is returned to the creative exchange platform by using the connection, the connection is released. In an alternative manner of communication between the creative exchange platform and the advertising creative manufacturing system, communication between the creative exchange platform and the advertising creative manufacturing system may be implemented in a session manner. Each connection between the creative exchange platform and the advertising creative manufacturing system may carry a plurality of sessions, and each session is used for search of one page and transmission of a search result.

Figures 1, 8:
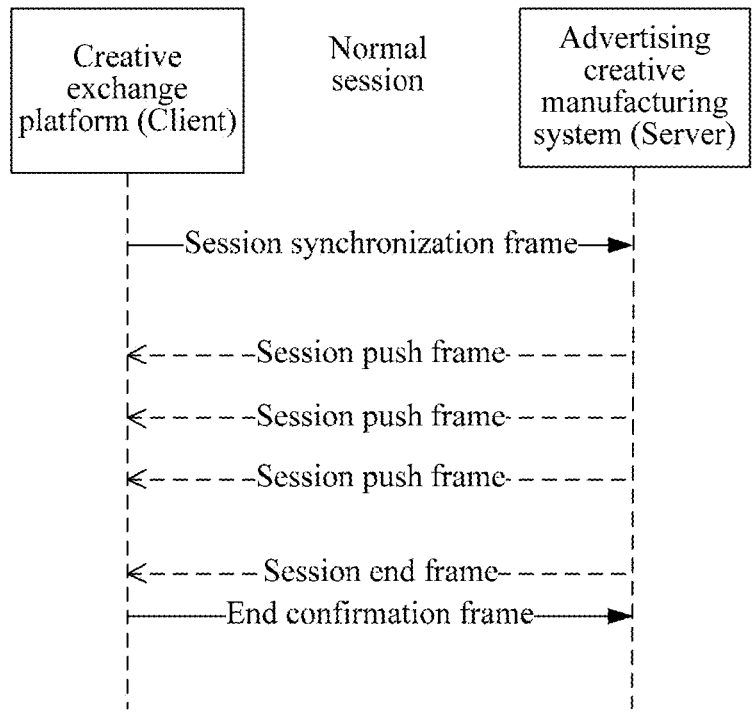
Figures 2, 8:
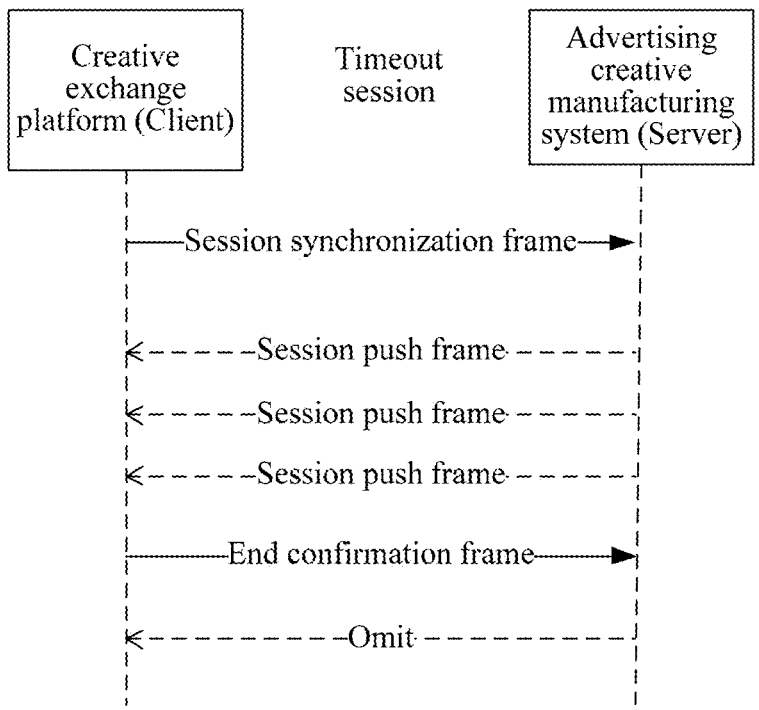

FIG. 8-1 is a schematic diagram of a session carried in a connection between a creative exchange platform and an advertising creative manufacturing system. The creative exchange platform is used as a client of a web socket connection, and the advertising creative manufacturing system is used as a server of the web socket connection.

The creative exchange platform initiates a connection, and adds a token to a uniform resource locator (URL), and the advertising creative manufacturing system on a supplier side receives, after the token is verified, a request to establish the connection. In a normal case, the advertising creative manufacturing system on the supplier side does not disconnect the connection, and the creative exchange platform reuses the connection in a session manner. A session that is between the creative exchange platform and the advertising creative manufacturing system on the supplier side and used for searching for a page is defined by a session synchronization frame (which is sent from the creative exchange platform to the creative manufacturing system on the supplier side) and a session end frame (which is sent from the advertising creative manufacturing system on the supplier side to the creative exchange platform), and is confirmed by an end confirmation frame (which is sent from the creative exchange platform to the advertising creative manufacturing system on the supplier side).

The creative manufacturing request is encapsulated into a session synchronization frame, and is sent to the advertising creative manufacturing system by the creative exchange platform. The session synchronization frame may use the data structure of the foregoing creative manufacturing request and is added with frame type information (which is used for indicating that the frame is a session synchronization frame). The creative manufacturing request is sent to the advertising creative manufacturing system by using the session synchronization frame, and a creative manufacturing request ID carried in the session synchronization frame is used for determining a creative manufacturing request to which the session belongs. The advertising creative manufacturing system returns an advertising creative to the creative exchange platform by using a session push frame. The session push frame may use the data structure of the foregoing advertising creative search result and is added with frame type information (which is used for indicating that the frame is a session push frame). After returning an advertising creative included in a page the creative exchange platform requests to search for, the advertising creative manufacturing system sends a session end frame to the creative exchange platform. In an optional data structure of the session end frame, a frame type of the session end frame, a current request sequence number, an end status, and a specific reason for the ending are carried.

After receiving the session end frame from the advertising creative manufacturing system, as a response, the creative exchange platform returns an end confirmation frame to the advertising creative manufacturing system to end the session. In an optional data structure of the end confirmation frame, the end confirmation frame carries a frame type, a current request sequence number, and an ending status.

A session used for searching, by the creative exchange platform, for an advertising creative included in a page is always carried in one connection. Therefore, no session is across connections, that is, all frames of a session are transmitted by using a same web socket-based connection.

For a same connection, sessions carried in the connection are continuous in time. Two different sessions that are successively carried in a same connection are defined by using a particular session frame. Referring to FIG. 8-1, when no session times out (when the creative exchange platform receives a session end frame from the advertising creative manufacturing system within preset time), a session synchronization frame of a session that is subsequently initiated in a same connection is inevitably sent out after an end confirmation frame of a session that is previously initiated, and a session push frame (which carries an advertising creative included in a searched page) between the session synchronization frame and the end confirmation frame that are successively transmitted in the connection is identified as all session push frames of the session. Therefore, no session overlapping occurs. The session synchronization frame and the end confirmation frame that are successively transmitted herein means no other session synchronization frame or end confirmation frame is transmitted between the session synchronization frame and the end confirmation frame.

Referring to FIG. 8-2, when a session times out (that is, the creative exchange platform does not receive a session end frame from the advertising creative manufacturing system within preset time after initiating a session synchronization frame), the creative exchange platform sends an end confirmation frame in advance (that is, no longer waits for the session end frame) to actively end the current session. A session push frame (which carries an advertising creative included in a searched page) between the session synchronization frame and the end confirmation frame that are successively transmitted in a connection and the sent session synchronization frame are identified as all session synchronization frames of the timeout session, and all subsequent session push frames are omitted. A subsequent session initiated by using the same connection still uses the session synchronization frame as a start frame. Therefore, even if the session times out, session overlapping still can be avoided.

To maximally improve the performance of returning the advertising creative to the advertiser side, the creative exchange platform uses a parallel mechanism at three levels:

(1) The creative manufacturing request is simultaneously sent to a plurality of advertising creative manufacturing systems (that is, is simultaneously sent to a plurality of creative supplier sides), and the plurality of creative supplier sides starts manufacturing advertising creatives in parallel.

(2) For all advertising creatives generated by one supplier side, the advertising creatives are obtained in a long-polling pagination search manner. Advertising creatives in pages are asynchronously processed, that is, when an advertising creative in a page is searched for, there is no need to wait for an advertising creative in a page that is previously searched for to be returned.

(3) Parallel processing is performed on a plurality of advertising creatives in a same page, including image verification and storage, and the like. After advertising creatives in a page are processed, a search result that is assembled into a page is returned to the advertiser side.

Figure 9:
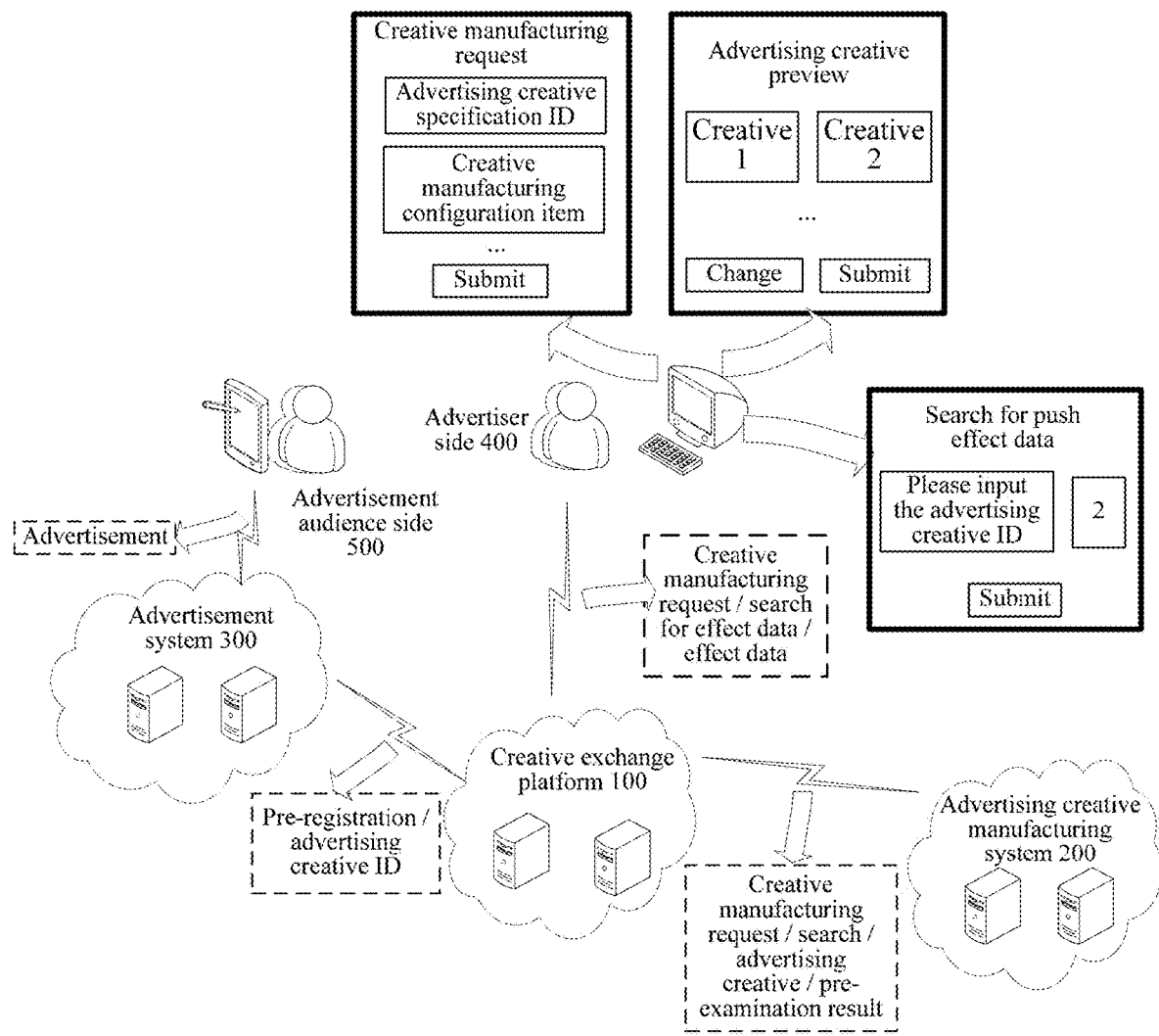
FIG. 9 is an optional schematic diagram of a scenario in which an advertising creative processing system processes an advertising creative according to an embodiment of the present technology.

The following further provides descriptions with reference to an advertising creative processing system shown in FIG. 9. The advertising creative processing system includes: an advertiser side 400, an advertisement audience side 500, a creative exchange platform 100, an advertisement system 300, and advertising creative manufacturing systems 200, which are respectively described below.

The advertiser side 400 submits a creative manufacturing request to the creative exchange platform 100 when needing to push an advertisement but having no suitable advertising creative, where the creative manufacturing request carries an advertising creative specification, so that the creative exchange platform 100 returns an advertising creative meeting the advertising creative specification. The advertiser side 400 selects an advertising creative expected to be used and submits the advertising creative to the advertisement system 300. The advertisement system 300 pushes, based on the advertising creative, an advertisement on the advertisement audience side 500.

The advertisement audience side 500 includes advertisement audience and a set of software (for example, various application supporting advertisement playback) and hardware (for example, various terminals owned by the advertisement audience) that are of an advertisement slot used for advertisement playback, and plays, when receiving an advertisement pushed by the advertisement system 300, the advertisement in the advertisement position.

The creative exchange platform 100 causes, according to the creative manufacturing request submitted by the advertiser side 400, the advertising creative manufacturing systems 200 to manufacture advertising creatives in parallel. Each advertising creative manufacturing system 200 is searched, in plurality of parallel batches, for whether advertising creatives are manufactured (advertising creatives searched for in the batches are different), and causes the advertising creative manufacturing system 200 to immediately return, after an advertising creative in a corresponding batch is manufactured, the advertising creative to the creative exchange platform 100. The creative exchange platform 100 performs processing (for example, generating a preview and a corresponding identifier) on the advertising creative, and then returns the advertising creative to the advertiser side 400, so that the advertiser side 400 selects, based on the preview of the advertising creative, an advertising creative expected to be used.

The advertisement system 300 pushes, according to an identifier of the advertising creative expected to be used that is submitted by the advertiser side 400 and a targeting condition (for example, an advertisement push area, time, an application, and an advertisement audience group) preset for the advertiser side 400, an advertisement to the advertisement audience side 500.

The advertising creative manufacturing system 200 is operated by a creative supplier and is connected to the creative exchange platform 100, manufactures an advertising creative according to the creative manufacturing request sent by the creative exchange platform 100, and immediately returns, after an advertising creative in a batch searched for by the creative exchange platform 100 is manufactured, the advertising creative to the creative exchange platform.

FIG. 9 exemplarily shows a scenario in which the advertiser side 400 customizes an advertising creative and selects an advertising creative for advertisement push. The advertiser side 400 submits a creative manufacturing request (which carries information such as a material and an advertising creative specification) to the creative exchange platform 100. The creative exchange platform 100 simultaneously sends the creative manufacturing request to a plurality of advertising creative manufacturing systems 200 (only one is exemplarily shown in FIG. 9), so that the plurality of advertising creative manufacturing systems 200 simultaneously starts manufacturing advertising creatives. The creative exchange platform 100 returns manufactured advertising creatives (previews and IDs) to the advertiser side for selecting. Certainly, before the advertising creatives are returned to the advertiser side, pre-registration is performed in the advertisement system, and pre-examination is performed on the advertising creatives (if the pre-examination succeeds, the advertising creatives are returned to the advertising creative manufacturing system). The pre-examination is used for ensuring that an advertising creative returned to the advertiser side 400 meets the advertising creative specification).

When not satisfied with a currently displayed advertising creative, the advertiser side 400 may use a function of "change" to request for manufacturing another advertising creative. Because the foregoing parallel processing manner at three levels is used, an advertising creative that is re-requested to be manufactured still can be quickly returned to the advertiser side 400 until the advertiser side selects a satisfying advertising creative and submits a corresponding advertising creative ID to the advertisement system 300, so that the advertisement system 300 pushes, based on the advertising creative, an advertisement. Subsequently, the advertiser side 400 may further request the creative exchange platform 100 for push effect data of advertisement push performed by using the advertising creative as a reference of further manufacturing of an advertising creative and advertisement push.

As an optional logical function structure, the creative exchange platform 100 includes an obtaining unit, a manufacturing triggering unit, a search unit, and a creative processing unit that are successively connected. The obtaining unit obtains a creative manufacturing request submitted by the advertiser side. The creative manufacturing request carries at least an advertising creative specification. The manufacturing triggering unit sends the creative manufacturing request to at least one advertising creative manufacturing system, where the creative manufacturing request carries the advertising creative specification; and triggers the at least one advertising creative manufacturing system to manufacture advertising creatives in parallel, so that the advertising creatives manufactured by the advertising creative manufacturing system meet the advertising creative specification. After the manufacturing triggering unit sends the creative manufacturing request to the advertising creative manufacturing system, the creative processing unit obtains at least one of the following response information returned by each advertising creative manufacturing system after the advertising creative manufacturing system is triggered to manufacture the advertising creatives: the number of advertising creatives the advertising creative manufacturing system plans to manufacture; the number of batches used for searching the advertising creative manufacturing system for the advertising creatives; wait time of the batch, and the target number of advertising creatives that are searched for in each batch.

The search unit searches, based on a creative manufacturing response of the advertising creative manufacturing system, the advertising creative manufacturing system in parallel for whether an advertising creative included in a corresponding batch is manufactured, so that after the advertising creative included in any searched batch is manufactured, the advertising creative manufacturing system returns the manufactured advertising creative as a search result to the creative exchange platform.

For the search result of any respective batch that is returned by the advertising creative manufacturing system, that is, a combination of advertising creatives, the creative processing unit performs parallel processing on each advertising creative included in any respective batch, and sends the processed advertising creative to the advertiser side. For example, the creative processing unit performs the following processing on each advertising creative included in any respective batch:

(1) generating a preview and an identifier of each advertising creative, so that the advertiser side selects, based on the preview of each advertising creative, a target advertising creative, and submits an identifier of the target advertising creative to the advertisement system; and (2) verifying whether each advertising creative meets the advertising creative specification, and returning a verification result of the advertising creative to the advertising creative manufacturing system.

The creative manufacturing request submitted by the advertiser side may further include information such as a material and a creative manufacturing configuration item. Correspondingly, the manufacturing triggering unit obtains at least one of the following materials submitted by the advertiser side by using the creative manufacturing request: merchant information of the advertiser side; product information of the advertiser side, and a jump address. The creative manufacturing request sent by the manufacturing triggering unit 102 to the advertising creative manufacturing system carries the foregoing information, so that the at least one advertising creative manufacturing system manufactures, based on at least one material (for example, an image): the merchant information or the product information, the advertising creative, and the manufactured advertising creative meets the creative manufacturing configuration item.

For example, the creative manufacturing configuration item includes at least one of the following: (1) the target number of advertising creatives required by the advertiser side, used for causing the at least one advertising creative manufacturing system to manufacture the target number of advertising creatives; (2) an identifier of a creative supplier needing to be used by the advertiser side, used for causing an advertising creative manufacturing system corresponding to the identifier to manufacture the advertising creatives; (3) an advertising creative template needing to be used by the advertiser side, used for causing the advertising creative manufacturing system to use the advertising creative template to manufacture the advertising creatives; and (4) an upper time limit of the advertising creatives, used for causing the at least one advertising creative manufacturing system to complete manufacturing of the target number of advertising creatives before the upper time limit expires.

When the search unit searches, in parallel and in batches, each advertising creative manufacturing system for different advertising creatives manufactured by the advertising creative manufacturing system, the following two manners are used:

Manner (1): wait time of searching the advertising creative manufacturing system for the advertising creative is waited to reach (the wait time is indicated in a creative manufacturing request response returned by the advertising creative manufacturing system after the advertising creative manufacturing system receives the creative manufacturing request), a connection is established to the advertising creative manufacturing system (the number of connections may be consistent with the number of batches used by the advertising creative manufacturing system for returning advertising creatives to the creative exchange platform), the established different connections are used for searching in parallel the advertising creative manufacturing system for an advertising creative included in a corresponding batch, so that after the advertising creative included in any searched batch is manufactured, the advertising creative manufacturing system returns the advertising creative as a search result of the corresponding batch by using the connection. After the advertising creative included in any respective batch is obtained, the connection established for the corresponding batch is released.

Manner (2): At least two connections are established to the advertising creative manufacturing system; the advertising creative manufacturing system is searched, in parallel by means of sessions in the established connections (each connection carries only one session at any time), for an advertising creative included in a corresponding batch; after the advertising creative included in any searched batch is manufactured, the advertising creative manufacturing system uses the manufactured advertising creative as a search result of the corresponding batch, and returns the search result by using a session carried in the connection; after the advertising creative included in the searched batch is obtained by using the session carried in the connection, a new session is set up in the connection, and the advertising creative manufacturing system is searched, by using the new session, for an advertising creative included in another batch, thereby implementing reuse of the connection.

Before returning the advertising creative to the advertiser side, the creative processing unit further performs pre-registration processing on the advertising creative returned by the creative exchange platform, including: locally storing a material (for example, an image) in the advertising creative in the creative exchange platform, and sending the advertising creative, the material in the advertising creative, and an advertising creative identifier to the advertisement system for registration, so that the advertisement system associates the material in the advertising creative, the advertising creative identifier, and an identifier of an advertisement pushed based on the advertising creative, to form an association relationship. The advertisement identifier is returned to the creative processing unit. The creative processing unit returns the advertising creative, the advertising creative identifier, the preview of the advertising creative, and the advertisement identifier to the advertiser side. When selecting an advertising creative (a target advertising creative) required for advertisement push, the advertiser side submits an advertising creative identifier to the advertisement system. The advertisement system determines, based on an association relationship formed by means of pre-registration, the advertising creative corresponding to the identifier of the target advertising creative, and further returns the advertising creative identifier and a preview of the advertising creative to the advertiser side when pushing an advertisement with reference to an associated material. The advertiser side selects, based on the preview of the advertising creative, the advertising creative needing to be used for advertisement push, and submits, to the advertisement system, the identifier of the advertising creative that is specified by the advertiser side and needs to be used for advertisement push, so that the advertisement system uses, based on the advertising creative identifier, the corresponding advertising creative to push the advertisement for the advertiser.

To support the advertiser side to search for push effect data of advertisement push performed by using an advertising creative, the creative processing unit associates an advertising creative identifier with an advertisement identifier that are submitted by the advertiser side, to form an association relationship. When receiving a request of the advertiser side for searching for push effect data of advertisement push performed by using an advertising creative, the creative processing unit determines, based on an identifier of an target advertising creative carried in a search request and an association relationship, an identifier of a target advertisement pushed by using the target advertising creative, and searches, based on the identifier of the target advertisement, the advertisement system for push effect data of the target advertisement. Push effect data of different advertisements is maintained in the advertisement system by using identifiers of the advertisements as indexes.

Based on the above, in some embodiments, a method for processing creatives exchange includes: at a server (e.g., server for the creative exchange platform 100) having one or more processors and memory, the server providing an exchange platform (e.g., 100 in FIG. 1) linking a plurality of requesters for creatives (e.g., advertiser side 400 including multiple advertisers) and a plurality of creative manufacturing systems (e.g., advertising creative manufacturing systems 200): receiving a creative manufacturing request from a first requester (e.g., a first advertiser), the creative manufacturing request includes a specification for required creatives and a required quantity for the required creatives; distributing the specification for the required creatives to the plurality of creative manufacturing systems, including at least a first creative manufacturing system and a second creative manufacturing system that is independent of the first creative manufacturing system; triggering parallel manufacturing of the required creatives on at least the first creative manufacturing system and the second creative manufacturing system, wherein the first creative manufacturing system proceeds with a first portion of the required quantity and the second creative manufacturing system proceeds with a second portion of the required quantity; and before completion of manufacturing of the first portion of the required quantity by the first creative manufacturing system and before completion of manufacturing of the second portion of the required quantity by the second creative manufacturing system: independently requesting and receiving, in multiple discrete batches, respective quantities of the required creatives that have been completed by the first creative manufacturing system and the second creative manufacturing system; and performing independent and parallel verification on the respective quantities of the required creatives that have been completed by the first creative manufacturing system and the second creative manufacturing system.

In some embodiments, requesting and receiving, in multiple discrete batches, a respective quantity of the required creatives that have been completed by the first creative manufacturing system includes: periodically issuing a search query to the first creative manufacturing system for the required creatives; and for each of the search query that is issued to the first creative manufacturing system, receiving a respective search result page including a corresponding set of new creatives that have been manufactured by the first creative manufacturing system in accordance with the specification.

In some embodiments, independently requesting and receiving, in multiple discrete batches, respective quantities of the required creatives that have been completed by the first creative manufacturing system and the second creative manufacturing system includes: periodically issuing the search query to the second creative manufacturing system for the required creatives; and for each of the search query that is issued to the second creative manufacturing system, receiving a respective search result page including a corresponding set of new creatives that have been manufactured by the second creative manufacturing system in accordance with the specification, wherein: the periodic issuance of the search query to the first creative manufacturing system and the periodic issuance of the search query to the second creative manufacturing system are independently timed for the first creative manufacturing system and the second creative manufacturing system.

In some embodiments, for a respective batch of the multiple discrete batches: issuance time of the search query to the first creative manufacturing system is dependent on a receipt time of the respective search result page received from the first creative manufacturing system for an immediately preceding batch of the respective batch; issuance time of the search query to the second creative manufacturing systems is dependent on a receipt time of the respective search result page received from the second creative manufacturing system for an immediately preceding batch of the respective batch; and the issuance times of the search query for the first and second creative manufacturing systems become asynchronized after the search query is issued to the first and second creative manufacturing systems one or more times.

In some embodiments, the method includes: establishing and maintaining a first persistent connection for requesting and receiving each of the multiple discrete batches of the required creatives that have been completed by the first creative manufacturing system; and establishing and maintaining a second persistent connection for requesting and receiving each of the multiple discrete batches of the required creatives that have been completed by the second creative manufacturing system.

In some embodiments, a new connection is established for the requesting and receiving of each batch of the multiple discrete batches of the required creatives that have been completed by the first creative manufacturing system and the second creative manufacturing system.

In some embodiments, the method includes: obtaining response information returned by each respective creative manufacturing system after the respective creative manufacturing system is triggered to manufacture the required creatives in response to distribution of the specification to the plurality of creative manufacturing systems, the response information includes at least one of: a respective quantity of the required creatives that the respective creative manufacturing system plans to manufacture; a total number of discrete batches to be used to search and retrieve the respective quantity of manufactured creatives; and a wait time for each batch; and a target number of creatives that are expected in each batch.

Other details of the method are disclosed earlier in the specification, and are not repeated herein in the interest of brevity.

An embodiment of the present technology further provides a computer-readable medium which may be a read-only memory (ROM) (for example, a ROM, a flash memory, or a transfer apparatus), a magnetic storage medium (for example, a magnetic tape or a disk drive), an optical storage medium (for example, a compact disc read-only memory (CD-ROM), a digital versatile disc read-only memory (DVD-ROM), a corrugated board, or a tape), and other well-known types of program memories. The computer-readable medium stores computer-executable instructions, and the computer-executable instructions, when executed, cause at least one processor to perform the methods described herein.

During actual application, the advertising creative processing apparatus may be implemented by a processor such as a CPU or a microprocessor (MCU) and a storage medium at a hardware layer. The storage medium stores executable instructions; and the advertising creative processing apparatus is implemented by the processor by executing the executable instructions in the storage medium.

Figure 10:
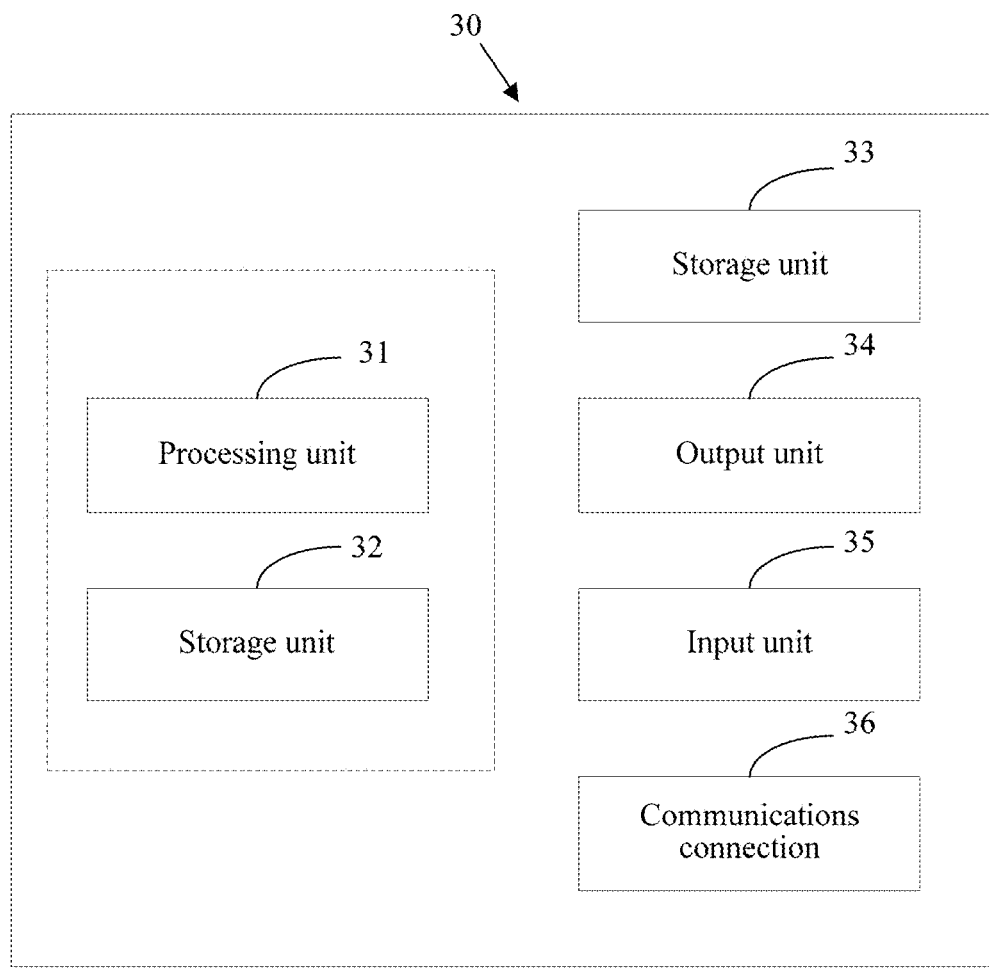
FIG. 10 is a schematic structural diagram of hardware of an advertising creative processing apparatus according to an embodiment of the present technology.

FIG. 10 is exemplarily a schematic structural diagram of an advertising creative processing apparatus according to an embodiment of the present technology. The structure shown in FIG. 10 is merely an example of a proper structure, and is not intended to make any limitation to the structure of the advertising creative processing apparatus. The advertising creative processing apparatus 30 includes a server computer, a small computer, a mainframe computer, any distributed computing environment of the foregoing device, and the like.

Although without requirements, this embodiment is described in a general background in which "computer-readable instructions" are executed by one or more advertising creative processing apparatuses. The computer-readable instructions may be distributed by using a computer-readable medium (as discussed below). The computer-readable instructions may be implemented as a program module, for example, a function, an object, an application programming interface (API), or a data structure for executing a particular task or implementing a particular abstract data type. Typically, functions of the computer-readable instructions may be randomly combined or distributed in various environments.

FIG. 10 shows an example of the structure of the advertising creative processing apparatus 30 provided in this embodiment of the present technology. In a configuration, the advertising creative processing apparatus 30 includes at least one processing unit 31 and a storage unit 32. According to the definite configuration and type of the advertising creative processing apparatus, the storage unit 32 may be volatile (for example, a random access memory (RAM)), may be non-volatile (for example, a ROM or a flash memory), or may be a combination of the two. The configuration is indicated by using dotted lines in FIG. 10.

In another embodiment, the advertising creative processing apparatus 30 may include an additional feature and/or function. For example, the advertising creative processing apparatus 30 may further include an additional storage apparatus (which may be, for example, removable and/or irremovable), and may include, but is not limited to, a magnetic storage apparatus, an optical storage apparatus, and the like. Such additional storage apparatus is represented by the storage unit 33 in FIG. 10. In an embodiment, computer-readable instructions used for implementing one or more embodiments provided in the embodiments of the present technology may be stored in the storage unit 33. The storage unit 33 may further store another computer-readable instruction used for implementing an operating system, an application program, or the like. The computer-readable instructions may be loaded to the storage unit 32 and may be executed by, for example, the processing unit 31.

The term "computer-readable medium" used in this embodiment of the present technology includes a computer storage medium. The computer storage medium includes a volatile medium, a non-volatile medium, a removable medium, or an irremovable medium that is used for storing information such as the computer-readable instructions (used for implementing the advertising creative processing method provided in the embodiments of the present technology) or other data and is implemented by using any method or technology. The storage unit 32 and the storage unit 33 are examples of the computer storage medium. The computer storage medium includes, but is not limited to, a volatile RAM, a ROM, an electrically erasable programmable read only memory (EEPROM), a flash memory or other memory technologies, a CD-ROM, a DVD or other optical storage apparatuses, a cassette, a magnetic tape, a magnetic disk storage apparatus or other magnetic storage devices, or any other mediums that can be used for storing expected information and can be accessed by the advertising creative processing apparatus 30. Any such computer storage medium may be a part of the advertising creative processing apparatus 30.

The advertising creative processing apparatus 30 may further include a communications connection 36 for allowing the advertising creative processing apparatus 30 to communicate with another device. The communications connection 36 may include, but is not limited to, a modem, a network interface card (NIC), an integrated network interface, a radio frequency transmitter/receiver, an infrared plot, a universal serial bus (USB) connection, or other interfaces used for connecting the advertising creative processing apparatus 30 to another advertising creative processing apparatus. The communications connection 36 may include a wired connection or a wireless connection. The communications connection 36 may transmit and/or receive a communications medium.

The term "computer-readable medium" may include a communications medium. Typically, the communications medium includes computer-readable instructions or other data in a "modulated data signal" in a carrier or other transmission mechanisms, and includes any information transmission medium. The term "modulated data signal may include such signal: one or more signal characteristics are set or changed in a manner of encoding information into the signal.

The advertising creative processing apparatus 30 may include an input unit 35, for example, a keyboard, a mouse, a pen, a speech input device, a touch input device, a video input device, and/or any other input device. The advertising creative processing apparatus 30 may further include an output unit 34, for example, one or more displays and/or any other output device. The input unit 35 and the output unit 34 may be connected to the advertising creative processing apparatus 30 by means of wired connection, wireless connection, or any combination thereof. In an embodiment, an input device or an output device of another advertising creative processing apparatus may be used as the input unit 35 or the output unit 34 of the advertising creative processing apparatus 30.

Components of the advertising creative processing apparatus 30 may be connected by means of various interconnections (for example, a bus). Such interconnection may include a peripheral component interconnect (PCI) (for example, a fast PCI), a USB, FireWire (IEEE 1394), an optical bus structure, or the like. In another embodiment, the components of the advertising creative processing apparatus 30 may be interconnected through a network. For example, the storage unit 32 may include a plurality of physical storage units that are located in different physical locations and are connected through the network.

In the embodiments of the present technology, a programmatic creative manufacturing and exchange technology based on high parallel processing includes:
(1) simultaneously sending a creative manufacturing request to a plurality of advertising creative manufacturing systems; (2) searching all advertising creatives generated by one supplier side in a long-polling pagination search and pulling manner; and (3) performing parallel processing on a plurality of advertising creatives in a same page. The advertising creatives are programmatically and automatically generated by a plurality of suppliers according to conditions, such as merchant information, product information, and an advertisement specification limitation, that are provided by an advertiser side without manual participation, thereby greatly reducing human communication costs and design resources in an advertising creative manufacturing process, and shortening a period of manufacturing of an advertising creative and returning of the advertising creative to the advertiser side.

On one hand, the efficiency of generation of an advertising creative and returning of the advertising creative to the advertiser side is improved. On the other hand, a problem of advertising creative homogenization may occur due to the limitation of the number of suppliers and the number of templates on the supplier side and different algorithmic logic implementations of different suppliers. Therefore, when the advertiser side is not satisfied with a current advertising creative and selects a change function to cause the advertising creative manufacturing system to re-manufacture an advertising creative, the period of returning of the advertising creative to the advertiser side can be maximally shortened.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present technology shall be subject to the protection scope of the claims.

What is claimed is:
1. A method, comprising:
at a server having one or more processors and memory, the server providing an exchange platform linking a plurality of requesters for creatives and a plurality of automated creative manufacturing systems:
receiving, by the server, a creative manufacturing request from a first requester, the creative manufacturing request includes a specification for required creatives and a required quantity for the required creatives, wherein the specification includes requirement for image or video;

distributing, by the server, the specification for the required creatives as respective session synchronization frames to the plurality of creative manufacturing systems, including at least a first creative manufacturing system and a second creative manufacturing system that is independent of the first creative manufacturing system;

triggering, by the server, parallel manufacturing of the required creatives on at least the first creative manufacturing system and the second creative manufacturing system, wherein the first creative manufacturing system proceeds with a first portion of the required quantity and the second creative manufacturing system proceeds with a second portion of the required quantity; and before completion of manufacturing of the first portion of the required quantity by the first creative manufacturing system and before completion of manufacturing of the second portion of the required quantity by the second creative manufacturing system:

independently requesting and receiving, by the server and in multiple discrete batches, respective quantities of the required creatives that have been completed by the first creative manufacturing system and the second creative manufacturing system as one or more respective session push frames;

performing, by the server, independent and parallel verification on the respective quantities of the required creatives that have been completed by the first creative manufacturing system and the second creative manufacturing system; and in accordance with a determination that the server does not receive respective session end frames from the first creative manufacturing system and the second creative manufacturing system within preset time after distributing the respective session synchronization frames:

sending, by the server and to the first creative manufacturing system and the second creative manufacturing system, respective end confirmation frames.

2. The method of claim 1, wherein requesting and receiving, by the server and in multiple discrete batches, a respective quantity of the required creatives that have been completed by the first creative manufacturing system includes:

periodically issuing, by the server, a search query to the first creative manufacturing system for the required creatives; and for each of the search query that is issued to the first creative manufacturing system, receiving, by the server, a respective search result page including a corresponding set of new creatives that have been manufactured by the first creative manufacturing system in accordance with the specification.

3. The method of claim 2, wherein independently requesting and receiving, by the server and in multiple discrete batches, respective quantities of the required creatives that have been completed by the first creative manufacturing system and the second creative manufacturing system includes:

periodically issuing, by the server, the search query to the second creative manufacturing system for the required creatives; and for each of the search query that is issued to the second creative manufacturing system, receiving, by the server, a respective search result page including a corresponding set of new creatives that have been manufactured by the second creative manufacturing system in accordance with the specification, wherein:

the periodic issuance of the search query to the first creative manufacturing system and the periodic issuance of the search query to the second creative manufacturing system are independently timed for the first creative manufacturing system and the second creative manufacturing system.

4. The method of claim 3, wherein:

for a respective batch of the multiple discrete batches:

issuance time of the search query to the first creative manufacturing system is dependent on a receipt time of the respective search result page received from the first creative manufacturing system for an immediately preceding batch of the respective batch;

issuance time of the search query to the second creative manufacturing systems is dependent on a receipt time of the respective search result page received from the second creative manufacturing system for an immediately preceding batch of the respective batch; and the issuance times of the search query for the first and second creative manufacturing systems become asynchronized after the search query is issued to the first and second creative manufacturing systems one or more times.

5. The method of claim 1, including:

establishing and maintaining, by the server, a first connection for requesting and receiving each of the multiple discrete batches of the required creatives that have been completed by the first creative manufacturing system; and establishing and maintaining, by the server, a second connection for requesting and receiving each of the multiple discrete batches of the required creatives that have been completed by the second creative manufacturing system.

6. The method of claim 1, wherein a new connection is established for the requesting and receiving of each batch of the multiple discrete batches of the required creatives that have been completed by the first creative manufacturing system and the second creative manufacturing system.

7. The method of claim 1, further comprising:

obtaining, by the server, response information returned by each respective creative manufacturing system after the respective creative manufacturing system is triggered to manufacture the required creatives in response to distribution of the specification to the plurality of creative manufacturing systems, the response information includes at least one of: a respective quantity of the required creatives that the respective creative manufacturing system plans to manufacture; a total number of discrete batches to be used to search and retrieve the respective quantity of manufactured creatives; and a wait time for each batch; and a target number of creatives that are expected in each batch.

8. A server providing an exchange platform linking a plurality of requesters for creatives and a plurality of automated creative manufacturing systems, the server comprising:

one or more processors; and memory storing instructions, the instructions, when executed by the one or more processors, cause the processors to perform:

receiving a creative manufacturing request from a first requester, the creative manufacturing request includes a specification for required creatives and a required quantity for the required creatives, wherein the specification includes requirement for image or video;

distributing the specification for the required creatives as respective session synchronization frames to the plurality of creative manufacturing systems, including at least a first creative manufacturing system and a second creative manufacturing system that is independent of the first creative manufacturing system;

triggering parallel manufacturing of the required creatives on at least the first creative manufacturing system and the second creative manufacturing system, wherein the first creative manufacturing system proceeds with a first portion of the required quantity and the second creative manufacturing system proceeds with a second portion of the required quantity; and before completion of manufacturing of the first portion of the required quantity by the first creative manufacturing system and before completion of manufacturing of the second portion of the required quantity by the second creative manufacturing system:

independently requesting and receiving, in multiple discrete batches, respective quantities of the required creatives that have been completed by the first creative manufacturing system and the second creative manufacturing system as one or more respective session push frames;

performing independent and parallel verification on the respective quantities of the required creatives that have been completed by the first creative manufacturing system and the second creative manufacturing system; and in accordance with a determination that the server does not receive respective session end frames from the first creative manufacturing system and the second creative manufacturing system within preset time after distributing the respective session synchronization frames:

sending, to the first creative manufacturing system and the second creative manufacturing system, respective end confirmation frames.

9. The server of claim 8, wherein requesting and receiving, in multiple discrete batches, a respective quantity of the required creatives that have been completed by the first creative manufacturing system includes:

periodically issuing a search query to the first creative manufacturing system for the required creatives; and for each of the search query that is issued to the first creative manufacturing system, receiving a respective search result page including a corresponding set of new creatives that have been manufactured by the first creative manufacturing system in accordance with the specification.

10. The server of claim 9, wherein independently requesting and receiving, in multiple discrete batches, respective quantities of the required creatives that have been completed by the first creative manufacturing system and the second creative manufacturing system includes:

periodically issuing the search query to the second creative manufacturing system for the required creatives; and for each of the search query that is issued to the second creative manufacturing system, receiving a respective search result page including a corresponding set of new creatives that have been manufactured by the second creative manufacturing system in accordance with the specification, wherein:

the periodic issuance of the search query to the first creative manufacturing system and the periodic issuance of the search query to the second creative manufacturing system are independently timed for the first creative manufacturing system and the second creative manufacturing system.

11. The server of claim 10, wherein:

for a respective batch of the multiple discrete batches:

issuance time of the search query to the first creative manufacturing system is dependent on a receipt time of the respective search result page received from the first creative manufacturing system for an immediately preceding batch of the respective batch;

issuance time of the search query to the second creative manufacturing systems is dependent on a receipt time of the respective search result page received from the second creative manufacturing system for an immediately preceding batch of the respective batch; and the issuance times of the search query for the first and second creative manufacturing systems become asynchronized after the search query is issued to the first and second creative manufacturing systems one or more times.

12. The server of claim 8, wherein the memory further includes instructions, which when executed by the one or more processors, cause the processors to perform:

establishing and maintaining a first connection for requesting and receiving each of the multiple discrete batches of the required creatives that have been completed by the first creative manufacturing system; and establishing and maintaining a second connection for requesting and receiving each of the multiple discrete batches of the required creatives that have been completed by the second creative manufacturing system.

13. The server of claim 8, wherein a new connection is established for the requesting and receiving of each batch of the multiple discrete batches of the required creatives that have been completed by the first creative manufacturing system and the second creative manufacturing system.

14. The server of claim 8, wherein the memory further includes instructions, which when executed by the one or more processors, cause the processors to perform:

obtaining response information returned by each respective creative manufacturing system after the respective creative manufacturing system is triggered to manufacture the required creatives in response to distribution of the specification to the plurality of creative manufacturing systems, the response information includes at least one of: a respective quantity of the required creatives that the respective creative manufacturing system plans to manufacture; a total number of discrete batches to be used to search and retrieve the respective quantity of manufactured creatives; and a wait time for each batch; and a target number of creatives that are expected in each batch.

15. A non-transitory computer-readable storage medium for providing an exchange platform linking a plurality of requesters for creatives and a plurality of creative manufacturing systems, the computer-readable storage medium storing instructions, the instructions, when executed by one or more processors, cause the processors to perform:

receiving a creative manufacturing request from a first requester, the creative manufacturing request includes a specification for required creatives and a required quantity for the required creatives;

distributing the specification for the required creatives as respective session synchronization frames to the plurality of creative manufacturing systems, including at least a first creative manufacturing system and a second creative manufacturing system that is independent of the first creative manufacturing system;

triggering parallel manufacturing of the required creatives on at least the first creative manufacturing system and the second creative manufacturing system, wherein the first creative manufacturing system proceeds with a first portion of the required quantity and the second creative manufacturing system proceeds with a second portion of the required quantity; and before completion of manufacturing of the first portion of the required quantity by the first creative manufacturing system and before completion of manufacturing of the second portion of the required quantity by the second creative manufacturing system:

independently requesting and receiving, in multiple discrete batches, respective quantities of the required creatives that have been completed by the first creative manufacturing system and the second creative manufacturing system as one or more respective session push frames;

performing independent and parallel verification on the respective quantities of the required creatives that have been completed by the first creative manufacturing system and the second creative manufacturing system; and in accordance with a determination that the server does not receive respective session end frames from the first creative manufacturing system and the second creative manufacturing system within preset time after distributing the respective session synchronization frames:

sending, to the first creative manufacturing system and the second creative manufacturing system, respective end confirmation frames.

16. The computer-readable storage medium of claim 15, wherein requesting and receiving, in multiple discrete batches, a respective quantity of the required creatives that have been completed by the first creative manufacturing system includes:

periodically issuing a search query to the first creative manufacturing system for the required creatives; and for each of the search query that is issued to the first creative manufacturing system, receiving a respective search result page including a corresponding set of new creatives that have been manufactured by the first creative manufacturing system in accordance with the specification.

17. The computer-readable storage medium of claim 16, wherein independently requesting and receiving, in multiple discrete batches, respective quantities of the required creatives that have been completed by the first creative manufacturing system and the second creative manufacturing system includes:

periodically issuing the search query to the second creative manufacturing system for the required creatives; and for each of the search query that is issued to the second creative manufacturing system, receiving a respective search result page including a corresponding set of new creatives that have been manufactured by the second creative manufacturing system in accordance with the specification, wherein:

the periodic issuance of the search query to the first creative manufacturing system and the periodic issuance of the search query to the second creative manufacturing system are independently timed for the first creative manufacturing system and the second creative manufacturing system.

18. The computer-readable storage medium of claim 17, wherein:

for a respective batch of the multiple discrete batches:

issuance time of the search query to the first creative manufacturing system is dependent on a receipt time of the respective search result page received from the first creative manufacturing system for an immediately preceding batch of the respective batch;

issuance time of the search query to the second creative manufacturing systems is dependent on a receipt time of the respective search result page received from the second creative manufacturing system for an immediately preceding batch of the respective batch; and the issuance times of the search query for the first and second creative manufacturing systems become asynchronized after the search query is issued to the first and second creative manufacturing systems one or more times.

19. The computer-readable storage medium of claim 15, wherein the memory further includes instructions, which when executed by the one or more processors, cause the processors to perform:

establishing and maintaining a first connection for requesting and receiving each of the multiple discrete batches of the required creatives that have been completed by the first creative manufacturing system; and establishing and maintaining a second connection for requesting and receiving each of the multiple discrete batches of the required creatives that have been completed by the second creative manufacturing system.

20. The computer-readable storage medium of claim 15, wherein a new connection is established for the requesting and receiving of each batch of the multiple discrete batches of the required creatives that have been completed by the first creative manufacturing system and the second creative manufacturing system.

* * * * *